United States Patent
Weagle

(10) Patent No.: US 11,524,744 B2
(45) Date of Patent: Dec. 13, 2022

(54) CYCLE SUSPENSION WITH ROTATION SENSOR

(71) Applicant: SPECIALIZED BICYCLE COMPONENTS, INC., Morgan Hill, CA (US)

(72) Inventor: David Weagle, Edgartown, MA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 827 days.

(21) Appl. No.: 16/379,386

(22) Filed: Apr. 9, 2019

(65) Prior Publication Data

US 2020/0324848 A1   Oct. 15, 2020

(51) Int. Cl.
| | |
|---|---|
| *B62K 25/08* | (2006.01) |
| *B62K 25/04* | (2006.01) |
| *B62J 45/20* | (2020.01) |
| *B62J 45/40* | (2020.01) |
| *B62J 99/00* | (2020.01) |
| *G01D 5/12* | (2006.01) |
| *G01D 5/26* | (2006.01) |
| *B62J 50/20* | (2020.01) |

(52) U.S. Cl.
CPC ............... *B62K 25/08* (2013.01); *B62J 99/00* (2013.01); *G01D 5/12* (2013.01); *G01D 5/26* (2013.01); *B62J 45/20* (2020.02); *B62J 45/40* (2020.02); *B62J 50/20* (2020.02); *B62K 2025/044* (2013.01)

(58) Field of Classification Search
CPC ... B62K 25/08; B62K 25/06; B62K 2025/044
See application file for complete search history.

(56) References Cited

U.S. PATENT DOCUMENTS

| | | |
|---|---|---|
| 389,200 A | 9/1888 | Clegg |
| 393,387 A | 11/1888 | Norton |
| 400,727 A | 4/1889 | Baudreau |
| 412,322 A | 10/1889 | Copeland |
| 414,048 A | 10/1889 | Hunter |
| 423,471 A | 3/1890 | Easthope |
| 426,402 A | 4/1890 | Torkelson |
| 435,477 A | 9/1890 | Blackledge |
| 441,649 A | 12/1890 | Dunlop |

(Continued)

FOREIGN PATENT DOCUMENTS

| | | |
|---|---|---|
| BE | 507753 A | 12/1951 |
| CA | 474575 A | 6/1951 |

(Continued)

OTHER PUBLICATIONS

Black and white photograph of Greeves trials machine, Applicant Admitted Prior Art, Applicant's internal files.

(Continued)

*Primary Examiner* — Tony H Winner
*Assistant Examiner* — Michael R Stabley
(74) *Attorney, Agent, or Firm* — Knobbe, Martens, Olson & Bear, LLP

(57) ABSTRACT

A suspension assembly for a cycle includes a plurality of links pivotably connected to one another by a plurality of pivots. A rotation sensor measures an angular relationship between two links and a setpoint of the suspension assembly is adjusted based on the angular measurements.

22 Claims, 14 Drawing Sheets

(56) References Cited

U.S. PATENT DOCUMENTS

| | | |
|---|---|---|
| 443,266 A | 12/1890 | Bell |
| 444,639 A | 1/1891 | O'Neill |
| 447,234 A | 2/1891 | Donnelly |
| 467,794 A | 1/1892 | Ellis |
| 468,643 A | 2/1892 | Clement |
| 524,389 A | 8/1894 | La Casse |
| 602,354 A | 4/1898 | Ohlgart |
| 638,723 A | 12/1899 | Kelly |
| 739,476 A | 9/1903 | Becker |
| 783,236 A | 2/1905 | Ashburn |
| 848,324 A | 3/1907 | Sager |
| 913,961 A | 3/1909 | Levedahl |
| 927,989 A | 7/1909 | Meiser |
| 940,245 A | 11/1909 | Gates |
| 946,143 A | 1/1910 | Levedahl |
| 953,697 A | 4/1910 | Kuebodeaux |
| 973,071 A | 10/1910 | Redmond |
| 979,674 A | 12/1910 | Kittle et al. |
| 980,999 A | 1/1911 | Pommer |
| 989,638 A | 4/1911 | Pilgrim |
| 1,000,115 A | 8/1911 | Oquist |
| 1,036,263 A | 8/1912 | Kittle |
| 1,042,480 A | 10/1912 | Ridgway |
| 1,077,105 A | 10/1913 | Stewart |
| 1,096,417 A | 5/1914 | Ekstrom |
| 1,101,614 A | 6/1914 | Bramham |
| 1,132,829 A | 3/1915 | Cobb |
| 1,144,753 A | 6/1915 | Budroe |
| 1,166,156 A | 12/1915 | Shimmin |
| 1,189,874 A | 7/1916 | Schickel |
| 1,203,927 A | 11/1916 | Stagni |
| 1,213,995 A | 1/1917 | Anderson |
| 1,223,572 A | 4/1917 | Drew |
| 1,227,634 A | 5/1917 | Lake |
| 1,251,992 A | 1/1918 | Drew |
| 1,254,798 A | 1/1918 | Harley |
| 1,273,179 A | 7/1918 | Perry et al. |
| 1,298,958 A | 4/1919 | Johnston |
| 1,333,449 A | 3/1920 | Russell |
| 1,365,524 A | 1/1921 | Mellantine |
| 1,397,850 A | 11/1921 | Yoxall et al. |
| 1,432,376 A | 10/1922 | Wolff |
| 1,452,436 A | 4/1923 | Pullin |
| 1,475,044 A | 11/1923 | Bloom |
| 1,517,146 A | 11/1924 | Bloom |
| 1,527,133 A | 2/1925 | Harley |
| 1,605,680 A | 11/1926 | Merkel |
| 1,834,308 A | 12/1931 | Harley |
| 1,924,363 A | 8/1933 | Kanai |
| 1,924,586 A | 8/1933 | Zerk |
| 1,999,394 A | 4/1935 | Burnett |
| 2,038,011 A | 4/1936 | Spiegler et al. |
| 2,073,736 A | 3/1937 | Duffy |
| 2,087,299 A | 7/1937 | Pribil |
| 2,160,034 A | 5/1939 | Schwinn |
| 2,170,565 A | 8/1939 | Macbeth |
| 2,203,342 A | 6/1940 | Sloman |
| 2,233,313 A | 2/1941 | Hazelroth |
| 2,271,304 A | 1/1942 | Mulholland |
| 2,303,568 A | 12/1942 | McWhorter et al. |
| 2,376,788 A | 5/1945 | Latscher-Latka |
| 2,462,711 A | 2/1949 | Barnett |
| 2,463,310 A | 3/1949 | Probst |
| 2,464,326 A | 3/1949 | MacGregor |
| 2,475,774 A | 7/1949 | Benson |
| 2,485,484 A | 10/1949 | Dean |
| 2,486,430 A | 11/1949 | Moore |
| 2,489,821 A | 11/1949 | Ryder |
| 2,504,452 A | 4/1950 | Rostan |
| 2,525,171 A | 10/1950 | Franks |
| 2,537,679 A | 1/1951 | Kraeft |
| 2,540,585 A | 2/1951 | Kranz |
| 2,543,991 A | 3/1951 | Schuricht |
| 2,550,876 A | 5/1951 | Spencer |
| 2,561,156 A | 7/1951 | Thorkildsen |
| 2,588,889 A | 3/1952 | Sherwood |
| 2,596,411 A | 5/1952 | Jordan |
| 2,636,567 A | 4/1953 | Landrum |
| 2,649,312 A | 8/1953 | Miller |
| 2,660,455 A | 11/1953 | Douglas et al. |
| 2,664,644 A | 1/1954 | Tyerman |
| 2,708,112 A | 5/1955 | Seddon et al. |
| 2,729,465 A | 1/1956 | Torre |
| 2,751,991 A | 6/1956 | Mennesson |
| 2,752,167 A | 6/1956 | Propst et al. |
| 2,756,070 A | 7/1956 | Torre |
| 2,756,832 A | 7/1956 | Dalrymple |
| 2,918,306 A | 12/1959 | Lewandoski |
| 2,953,395 A | 9/1960 | Turner |
| 2,969,992 A | 1/1961 | Hahn |
| 2,976,056 A | 3/1961 | Henry |
| 3,083,038 A | 3/1963 | Moulton |
| 3,133,748 A | 5/1964 | Gunnerson |
| 3,188,072 A | 6/1965 | Wustenhagen et al. |
| 3,433,318 A | 3/1969 | Packard |
| 3,673,608 A | 6/1972 | Voorman, Jr. |
| 3,694,004 A | 9/1972 | Siebers |
| 3,701,544 A | 10/1972 | Stankovich |
| 3,730,553 A | 5/1973 | Harman |
| 3,774,935 A | 11/1973 | Aldrich |
| 3,942,821 A | 3/1976 | Bock |
| 3,944,254 A | 3/1976 | Inui |
| 3,954,284 A | 5/1976 | Phillips et al. |
| 3,989,261 A | 11/1976 | Kawaguchi |
| 4,030,641 A | 6/1977 | Bailey et al. |
| 4,057,264 A | 11/1977 | Suzuki et al. |
| 4,058,903 A | 11/1977 | Wilkerson |
| 4,147,371 A | 4/1979 | Morita et al. |
| 4,153,237 A | 5/1979 | Supalla |
| 4,159,123 A | 6/1979 | Petty |
| 4,162,797 A | 7/1979 | McBride |
| 4,170,369 A | 10/1979 | Strutman |
| 4,179,135 A | 12/1979 | Slater |
| 4,180,280 A | 12/1979 | Doveri |
| 4,184,695 A | 1/1980 | Roe et al. |
| 4,186,936 A | 2/1980 | Offenstadt et al. |
| 4,189,168 A | 2/1980 | Courtney |
| 4,212,481 A | 7/1980 | Ribi |
| 4,242,481 A | 12/1980 | Fannin |
| 4,265,329 A | 5/1981 | de Cortanze |
| 4,268,055 A | 5/1981 | Bell |
| 4,295,658 A | 10/1981 | Kashima |
| 4,367,882 A | 1/1983 | Alexander et al. |
| 4,388,978 A | 6/1983 | Fior |
| 4,401,316 A | 8/1983 | Miyakoshi et al. |
| 4,406,475 A | 9/1983 | Miyakoshi et al. |
| 4,408,399 A | 10/1983 | Darwood et al. |
| 4,410,196 A | 10/1983 | Ribi |
| 4,421,337 A | 12/1983 | Pratt |
| 4,422,662 A | 12/1983 | Inoue et al. |
| 4,433,850 A | 2/1984 | Miyakoshi et al. |
| 4,433,851 A | 2/1984 | Miyakoshi et al. |
| 4,437,678 A | 3/1984 | Schultz |
| 4,438,909 A | 3/1984 | Matsumoto |
| 4,444,406 A | 4/1984 | Isono |
| 4,455,032 A | 6/1984 | Kajikawa |
| 4,480,711 A | 11/1984 | Satoh et al. |
| 4,520,892 A | 6/1985 | Satoh |
| 4,526,249 A | 7/1985 | Parker |
| 4,531,755 A | 7/1985 | Isono et al. |
| 4,533,153 A | 8/1985 | Tsunoda et al. |
| 4,540,190 A | 9/1985 | Moulton |
| 4,542,910 A | 9/1985 | Watanabe |
| 4,561,669 A | 12/1985 | Simons |
| 4,570,963 A | 2/1986 | Isono |
| 4,572,534 A | 2/1986 | Heyl |
| 4,576,393 A | 3/1986 | Moulton et al. |
| 4,585,245 A | 4/1986 | Rose |
| 4,616,810 A | 10/1986 | Richardson et al. |
| 4,625,985 A | 12/1986 | Nakano et al. |
| 4,629,205 A * | 12/1986 | Haynes ............... B62K 25/08 280/277 |
| 4,650,027 A | 3/1987 | de Cortanze |
| 4,660,683 A | 4/1987 | Hayashi et al. |

(56) References Cited

U.S. PATENT DOCUMENTS

| | | | |
|---|---|---|---|
| 4,685,694 A | 8/1987 | Kouyama |
| 4,702,338 A | 10/1987 | Trema |
| 4,703,839 A | 11/1987 | Yasuo et al. |
| 4,723,621 A | 2/1988 | Kawano et al. |
| 4,732,241 A | 3/1988 | Yoshida |
| 4,738,468 A | 4/1988 | Baron |
| 4,741,545 A | 5/1988 | Honma et al. |
| 4,742,884 A | 5/1988 | Ishikawa |
| 4,744,434 A | 5/1988 | Miyakoshi et al. |
| 4,770,434 A | 9/1988 | Pietro et al. |
| 4,775,163 A | 10/1988 | McGowan et al. |
| 4,776,609 A | 10/1988 | Pan et al. |
| 4,789,174 A | 12/1988 | Lawwill |
| 4,807,898 A | 2/1989 | Huntly |
| 4,809,802 A | 3/1989 | Seino et al. |
| 4,815,763 A | 3/1989 | Hartmann |
| 4,828,069 A | 5/1989 | Hatsuyama |
| 4,834,412 A | 5/1989 | Trema |
| 4,878,558 A | 11/1989 | Asakura |
| 4,881,750 A | 11/1989 | Hartmann |
| 4,890,857 A | 1/1990 | de Cortanze |
| 4,971,344 A | 11/1990 | Turner |
| 4,993,734 A | 2/1991 | Trema |
| 4,997,197 A | 3/1991 | Shultz |
| 5,009,451 A | 4/1991 | Hayashi et al. |
| 5,042,608 A | 8/1991 | Horiike et al. |
| 5,050,699 A | 9/1991 | Savard |
| 5,064,212 A | 11/1991 | Yun |
| 5,069,303 A | 12/1991 | Fuller |
| 5,069,467 A | 12/1991 | Claudio |
| 5,088,705 A | 2/1992 | Tsai |
| 5,133,223 A | 7/1992 | Morri |
| 5,156,231 A | 10/1992 | Trema |
| 5,186,481 A | 2/1993 | Turner |
| 5,193,832 A | 3/1993 | Wilson et al. |
| 5,193,833 A | 3/1993 | Reisinger |
| 5,195,766 A | 3/1993 | Dohrmann et al. |
| 5,219,211 A | 6/1993 | Tsuchida et al. |
| 5,248,159 A | 9/1993 | Moore |
| 5,249,650 A | 10/1993 | Tanaka |
| 5,269,549 A | 12/1993 | Wilson et al. |
| 5,284,352 A | 2/1994 | Chen |
| 5,299,820 A | 4/1994 | Lawwill |
| 5,308,099 A | 5/1994 | Browning |
| 5,310,203 A | 5/1994 | Chen |
| 5,320,374 A | 6/1994 | Farris et al. |
| 5,328,196 A | 7/1994 | Ohma |
| 5,350,185 A | 9/1994 | Robinson |
| 5,354,085 A | 10/1994 | Gally |
| 5,359,910 A | 11/1994 | Chang et al. |
| 5,361,864 A | 11/1994 | Tanaka |
| 5,380,026 A | 1/1995 | Robinson |
| 5,403,028 A | 4/1995 | Trimble |
| 5,405,159 A | 4/1995 | Klein et al. |
| 5,409,248 A | 4/1995 | Williams |
| 5,413,368 A | 5/1995 | Pong et al. |
| 5,417,446 A | 5/1995 | Pileggi |
| 5,427,208 A | 6/1995 | Motobu et al. |
| 5,427,397 A | 6/1995 | Chonan |
| 5,429,380 A | 7/1995 | Lawwill |
| 5,431,426 A | 7/1995 | Ijams et al. |
| 5,441,291 A | 8/1995 | Girvin, III |
| 5,449,155 A | 9/1995 | Mack |
| 5,456,480 A | 10/1995 | Turner et al. |
| 5,462,302 A | 10/1995 | Leitner |
| 5,487,223 A | 1/1996 | Krane |
| D368,054 S | 3/1996 | Behrens et al. |
| 5,498,013 A | 3/1996 | Hwang |
| 5,509,674 A | 4/1996 | Browning |
| 5,509,676 A | 4/1996 | Fukutake et al. |
| 5,564,534 A | 10/1996 | Toyoda et al. |
| 5,599,034 A | 2/1997 | Brigden |
| 5,615,756 A | 4/1997 | Grundei et al. |
| 5,709,399 A | 1/1998 | Smith, Jr. |
| 5,720,473 A | 2/1998 | Thomas |
| 5,743,547 A | 4/1998 | Voss et al. |
| 5,743,574 A | 4/1998 | Kohn |
| 5,749,590 A | 5/1998 | Roerig |
| 5,782,313 A | 7/1998 | Kurawaki et al. |
| 5,799,963 A | 9/1998 | Berkmann |
| 5,813,684 A | 9/1998 | Baron |
| 5,829,773 A | 11/1998 | Rajaee |
| 5,855,388 A | 1/1999 | Brewer |
| 5,899,478 A | 5/1999 | Woodside |
| 5,908,200 A | 6/1999 | Stewart |
| 5,927,741 A | 7/1999 | Chi |
| 5,931,487 A | 8/1999 | Koppelberg et al. |
| 5,931,489 A | 8/1999 | Damman et al. |
| 5,951,033 A | 9/1999 | Winter et al. |
| 6,017,047 A | 1/2000 | Hoose |
| 6,036,211 A | 3/2000 | Nohr |
| 6,047,981 A | 4/2000 | Burrows |
| 6,089,585 A | 7/2000 | Theobald |
| 6,149,173 A | 11/2000 | Bynoe |
| 6,152,472 A | 11/2000 | Woodside |
| 6,155,370 A | 12/2000 | Iwai et al. |
| 6,161,858 A | 12/2000 | Tseng |
| 6,164,424 A | 12/2000 | Girvin et al. |
| 6,164,675 A | 12/2000 | Pickering |
| 6,199,885 B1 | 3/2001 | Seidl |
| 6,241,391 B1 | 6/2001 | Hoose |
| 6,244,609 B1 | 6/2001 | Wilson |
| 6,260,869 B1 | 7/2001 | Hanlon et al. |
| 6,260,870 B1 | 7/2001 | Fan |
| 6,263,994 B1 | 7/2001 | Eitel |
| 6,311,961 B1 | 11/2001 | Julia |
| 6,336,647 B1 | 1/2002 | Iwai et al. |
| 6,357,775 B1 | 3/2002 | Iwai et al. |
| 6,371,263 B1 | 4/2002 | Hoose |
| 6,382,374 B1 | 5/2002 | Iwai et al. |
| 6,386,567 B1 | 5/2002 | Schonfeld |
| 6,402,175 B1 | 6/2002 | Jansson |
| 6,457,732 B2 | 10/2002 | Ito et al. |
| 6,485,043 B2 | 11/2002 | Ito et al. |
| 6,488,300 B2 | 12/2002 | Ito et al. |
| 6,517,095 B1 | 2/2003 | Lansac et al. |
| 6,517,096 B2 | 2/2003 | Yih |
| 6,533,305 B1 | 3/2003 | Falk |
| 6,783,140 B1 | 8/2004 | Huang |
| 6,789,810 B2 | 9/2004 | Strong |
| 6,896,276 B1 | 5/2005 | Sparrow |
| 6,908,092 B2 | 6/2005 | Kofuji et al. |
| 6,910,702 B1 | 6/2005 | Hals |
| 6,918,605 B2 | 7/2005 | Wada et al. |
| 6,994,365 B2 | 2/2006 | Kofuji |
| 7,011,325 B2 | 3/2006 | Kinzler et al. |
| 7,047,831 B2 | 5/2006 | Reynolds et al. |
| 7,140,627 B2 | 11/2006 | Wimmer |
| 7,159,883 B2 | 1/2007 | Mydlarz |
| 7,210,695 B2 | 5/2007 | Griffiths |
| 7,331,594 B2 | 2/2008 | Wimmer |
| 7,350,787 B2 | 4/2008 | Voss |
| 7,364,178 B2 | 4/2008 | Wimmer |
| 7,425,008 B2 | 9/2008 | Pokrywka |
| 7,425,009 B2 | 9/2008 | Namazue et al. |
| 7,434,823 B2 | 10/2008 | Robinson et al. |
| 7,441,622 B2 | 10/2008 | Costa |
| 7,635,141 B2 | 12/2009 | O'Connor |
| 7,699,330 B2 | 4/2010 | Chen |
| 7,708,296 B2 | 5/2010 | Becker et al. |
| 7,744,107 B2 | 6/2010 | Chen |
| 7,887,077 B2 | 2/2011 | Thiers |
| 7,896,379 B2 | 3/2011 | Nagao et al. |
| 8,333,528 B2 | 12/2012 | Oertley et al. |
| 8,448,970 B1 | 5/2013 | Vardon |
| 8,534,692 B2 | 9/2013 | Trebichavsky |
| 8,939,458 B2 | 1/2015 | Nesbitt, III |
| 9,194,456 B2 | 11/2015 | Laird et al. |
| 9,248,883 B2 | 2/2016 | D'Aluisio |
| 9,278,598 B2 | 3/2016 | Galasso et al. |
| 9,682,741 B2* | 6/2017 | Fioravanzo ............ B60G 17/02 |
| 9,707,817 B1 | 7/2017 | Arnott et al. |
| 10,099,743 B2 | 10/2018 | Walthert et al. |
| 10,196,106 B1 | 2/2019 | Weagle |

(56) References Cited

U.S. PATENT DOCUMENTS

| | | |
|---|---|---|
| 10,300,979 B2 | 5/2019 | Weagle |
| 10,308,312 B2 | 6/2019 | Weagle |
| D859,125 S | 9/2019 | Weagle et al. |
| D860,061 S | 9/2019 | Weagle et al. |
| D860,062 S | 9/2019 | Weagle |
| D861,542 S | 10/2019 | Weagle |
| 10,518,836 B2 | 12/2019 | Weagle |
| 10,518,839 B2 | 12/2019 | Weagle |
| 10,526,039 B2 | 1/2020 | Weagle |
| 10,526,040 B2 | 1/2020 | Weagle |
| 10,537,790 B2 | 1/2020 | Galasso et al. |
| 10,549,812 B2 | 2/2020 | Weagle |
| 10,549,813 B2 | 2/2020 | Weagle |
| 10,549,815 B2 | 2/2020 | Weagle |
| D880,369 S | 4/2020 | Weagle |
| D880,370 S | 4/2020 | Weagle |
| D880,371 S | 4/2020 | Weagle |
| D880,372 S | 4/2020 | Weagle |
| 10,689,061 B2 | 6/2020 | Weagle |
| 10,906,601 B2 * | 2/2021 | Aoki .................... B62D 55/065 |
| 11,084,552 B2 | 8/2021 | Weagle |
| 11,117,635 B2 | 9/2021 | Przykucki, Jr. et al. |
| 11,208,172 B2 | 12/2021 | Weagle |
| 11,230,346 B2 | 1/2022 | Weagle |
| 11,230,347 B2 | 1/2022 | Weagle |
| 11,230,348 B2 | 1/2022 | Weagle |
| 11,273,887 B2 | 3/2022 | Weagle |
| 11,345,432 B2 | 5/2022 | Weagle |
| 2001/0019197 A1 | 9/2001 | Ito et al. |
| 2002/0005066 A1 | 1/2002 | Tanner et al. |
| 2002/0079670 A1 | 6/2002 | Yih |
| 2002/0084619 A1 | 7/2002 | Odom |
| 2004/0036250 A1 | 2/2004 | Kofuji |
| 2005/0248119 A1 | 11/2005 | Callahan et al. |
| 2008/0023934 A1 | 1/2008 | van Houweling |
| 2008/0041681 A1 | 2/2008 | Shipman |
| 2008/0060863 A1 | 3/2008 | Iizuka |
| 2008/0258424 A1 | 10/2008 | Paul |
| 2008/0277848 A1 | 11/2008 | Davis |
| 2008/0296863 A1 | 12/2008 | Heyl et al. |
| 2008/0303242 A1 | 12/2008 | O'Connor |
| 2009/0001684 A1 | 1/2009 | McAndrews et al. |
| 2009/0033009 A1 | 2/2009 | Kirchner et al. |
| 2009/0266656 A1 | 10/2009 | Murakami |
| 2010/0010709 A1 | 1/2010 | Song |
| 2010/0244340 A1 | 9/2010 | Wootten et al. |
| 2011/0012321 A1 | 1/2011 | Chen |
| 2011/0083930 A1 | 4/2011 | Laird et al. |
| 2011/0093930 A1 | 4/2011 | Bartel-Kurz et al. |
| 2011/0156728 A1 * | 6/2011 | Sato .................... F02B 61/02 324/723 |
| 2012/0228850 A1 | 9/2012 | Tseng |
| 2012/0248666 A1 | 10/2012 | DeBruler et al. |
| 2014/0061987 A1 | 3/2014 | DeBruler et al. |
| 2014/0202809 A1 | 7/2014 | Ozaki et al. |
| 2014/0316652 A1 | 10/2014 | Ericksen et al. |
| 2015/0183440 A1 | 7/2015 | Jackson |
| 2015/0317065 A1 | 11/2015 | Meriaz et al. |
| 2015/0375823 A1 * | 12/2015 | Fioravanzo ............ B62K 25/04 701/38 |
| 2016/0288867 A1 | 10/2016 | Murakami |
| 2016/0339987 A1 | 11/2016 | Walthert et al. |
| 2016/0339989 A1 | 11/2016 | Walthert et al. |
| 2017/0087932 A1 | 3/2017 | Winshtein et al. |
| 2017/0198779 A1 | 7/2017 | Batsch et al. |
| 2017/0219041 A1 | 8/2017 | Debruler et al. |
| 2017/0284493 A1 | 10/2017 | Smith |
| 2018/0281878 A1 * | 10/2018 | Aoki .................... B62D 55/116 |
| 2018/0297435 A1 | 10/2018 | Brady et al. |
| 2018/0304952 A1 | 10/2018 | Krugman et al. |
| 2018/0334219 A1 | 11/2018 | Walthert et al. |
| 2019/0031275 A1 | 1/2019 | Weagle |
| 2019/0031276 A1 | 1/2019 | Weagle |
| 2019/0031277 A1 | 1/2019 | Weagle |
| 2019/0039681 A1 | 2/2019 | Weagle |
| 2019/0047657 A1 | 2/2019 | Weagle |
| 2019/0047658 A1 | 2/2019 | Weagle |
| 2019/0061865 A1 | 2/2019 | Weagle |
| 2019/0061866 A1 | 2/2019 | Weagle |
| 2019/0061867 A1 | 2/2019 | Weagle |
| 2019/0061868 A1 | 2/2019 | Weagle |
| 2019/0092116 A1 | 3/2019 | Magnus et al. |
| 2019/0168838 A1 | 6/2019 | Weagle |
| 2020/0079462 A1 | 3/2020 | Weagle |
| 2020/0079463 A1 | 3/2020 | Weagle |
| 2020/0094907 A1 | 3/2020 | Weagle |
| 2020/0094908 A1 | 3/2020 | Weagle |
| 2020/0094909 A1 | 3/2020 | Weagle |
| 2020/0094910 A1 | 3/2020 | Weagle |
| 2020/0094911 A1 | 3/2020 | Weagle |
| 2020/0108887 A1 | 4/2020 | Weagle |
| 2020/0115001 A1 | 4/2020 | Weagle |
| 2020/0115002 A1 | 4/2020 | Weagle |
| 2020/0354012 A1 | 11/2020 | Pelot |
| 2021/0323632 A1 | 10/2021 | Weagle |
| 2021/0323633 A1 | 10/2021 | Weagle |
| 2022/0097792 A1 | 3/2022 | Przykucki, Jr. et al. |
| 2022/0204123 A1 | 6/2022 | Weagle |

FOREIGN PATENT DOCUMENTS

| | | |
|---|---|---|
| CH | 63758 A | 2/1914 |
| CN | 1309053 | 8/2001 |
| CN | 2846274 Y | 12/2006 |
| CN | 201198348 | 2/2009 |
| CN | 302966622 S | 10/2014 |
| CN | 303438302 S | 11/2015 |
| CN | 303584666 S | 2/2016 |
| CN | 303604532 S | 3/2016 |
| CN | 304240449 S | 8/2017 |
| CN | 304327156 S | 10/2017 |
| DE | 1084599 B | 6/1960 |
| DE | 1122392 B | 1/1962 |
| DE | 3133576 A1 | 5/1983 |
| DE | 3223728 A1 | 12/1983 |
| DE | 8906328 U1 | 11/1989 |
| DE | 3833880 A1 | 4/1990 |
| DE | 4119339 A1 | 1/1992 |
| DE | 9404873 U1 | 5/1994 |
| DE | 9403640 U1 | 6/1994 |
| DE | 9414705 U1 | 2/1995 |
| DE | 19503047 A1 | 8/1996 |
| DE | 19635939 A1 | 6/1997 |
| DE | 19633692 A1 | 2/1998 |
| DE | 102013004788 | 9/2013 |
| DK | 49600 C | 12/1934 |
| EP | 0032170 B1 | 2/1986 |
| EP | 0030306 B1 | 4/1986 |
| EP | 0125244 B1 | 1/1987 |
| EP | 0399615 A2 | 11/1990 |
| EP | 0336891 | 7/1992 |
| EP | 420610 B1 | 2/1996 |
| EP | 726198 A2 | 8/1996 |
| EP | 0744562 | 11/1996 |
| EP | 0731017 B1 | 10/1997 |
| EP | 0941916 A1 | 9/1999 |
| EP | 0992374 A1 | 4/2000 |
| EP | 1049618 B1 | 9/2003 |
| EP | 728093 B2 | 11/2005 |
| EP | 02000398 A2 | 12/2008 |
| EP | 01884455 B1 | 4/2009 |
| EP | 2096024 A1 | 9/2009 |
| EP | 2100807 A1 | 9/2009 |
| EP | 2357098 A2 | 8/2011 |
| EP | 02001733 B1 | 12/2012 |
| EP | 2483141 B1 | 11/2013 |
| EP | 02913257 A1 | 9/2015 |
| FR | 347724 A | 3/1905 |
| FR | 353990 A | 9/1905 |
| FR | 350269 A | 12/1905 |
| FR | 376759 A | 8/1907 |
| FR | 467213 A | 6/1914 |
| FR | 547006 A | 11/1922 |
| FR | 559088 A | 9/1923 |

(56) References Cited

FOREIGN PATENT DOCUMENTS

| | | | |
|---|---|---|---|
| FR | 28240 E | 1/1925 |
| FR | 636211 A | 4/1928 |
| FR | 902973 A | 9/1945 |
| FR | 972653 A | 2/1951 |
| FR | 1030006 | 6/1953 |
| FR | 1030006 A | 6/1953 |
| FR | 1032268 A | 6/1953 |
| FR | 1059922 A | 3/1954 |
| FR | 1064265 A | 5/1954 |
| FR | 1067221 A | 6/1954 |
| FR | 1082316 A | 12/1954 |
| FR | 2418742 A1 | 9/1979 |
| FR | 2494208 A2 | 5/1982 |
| FR | 2687976 A1 | 9/1993 |
| FR | 2687976 B1 | 5/1994 |
| FR | 3004415 A1 | 10/2014 |
| GB | 166065 A | 7/1921 |
| GB | 223638 A | 10/1924 |
| GB | 238069 A | 8/1925 |
| GB | 239848 A | 12/1925 |
| GB | 258141 A | 9/1926 |
| GB | 264003 A | 1/1927 |
| GB | 279630 A | 11/1927 |
| GB | 302026 A | 12/1928 |
| GB | 322370 A | 12/1929 |
| GB | 469697 A | 7/1937 |
| GB | 585122 A | 1/1947 |
| GB | 585904 A | 2/1947 |
| GB | 586372 A | 3/1947 |
| GB | 691551 A | 5/1953 |
| GB | 717259 A | 10/1954 |
| GB | 720093 A | 12/1954 |
| GB | 824866 A | 12/1959 |
| GB | 841523 A | 7/1960 |
| GB | 1540824 A | 2/1979 |
| GB | 1545403 A | 5/1979 |
| GB | 2038736 A | 7/1980 |
| GB | 2052407 A | 1/1981 |
| GB | 2073680 A | 10/1981 |
| GB | 2106843 A | 4/1983 |
| JP | S60-110588 | 6/1985 |
| JP | S61-124683 | 2/1986 |
| JP | S61-160380 | 7/1986 |
| JP | S62-187608 | 8/1987 |
| JP | 63-112191 U | 7/1988 |
| JP | 649887 U | 1/1989 |
| JP | 1204884 A | 8/1989 |
| JP | 5069875 A | 3/1993 |
| JP | 05-020635 Y2 | 5/1993 |
| JP | 1999091671 A | 4/1999 |
| JP | 2000159170 A | 6/2000 |
| JP | 2000159171 A | 6/2000 |
| JP | 2000159177 A | 6/2000 |
| JP | 2000159178 A | 6/2000 |
| JP | 2000168666 A | 6/2000 |
| KR | 10-2009-0117921 | 11/2009 |
| TW | 416920 B | 1/2001 |
| TW | 484570 U | 4/2002 |
| TW | 568054 U | 12/2003 |
| TW | 596028 | 6/2004 |
| TW | D111693 | 7/2006 |
| TW | M335458 U | 7/2008 |
| TW | M354565 U | 4/2009 |
| TW | D140125 | 4/2011 |
| TW | D149623 | 10/2012 |
| WO | WO-82/00445 A1 | 2/1982 |
| WO | WO-84/00526 A1 | 2/1984 |
| WO | WO-87/01670 A1 | 3/1987 |
| WO | WO-95/23728 A1 | 9/1995 |
| WO | WO-97/46443 A1 | 12/1997 |
| WO | WO 1999/10224 | 3/1999 |
| WO | WO-00/013961 A1 | 3/2000 |
| WO | WO 2002/038437 | 5/2002 |
| WO | WO 2019/046039 | 3/2019 |
| WO | WO 2019/046040 | 3/2019 |

OTHER PUBLICATIONS

Black and white photograph of Scorpion motorcycle, Applicant Admitted Prior Art, Applicant's internal files.
Black and white photograph of Silencer motorcycle, Applicant Admitted Prior Art, Applicant's internal files.
Color Photograph of a Cotton TC-70 motorcycle, Applicant Admitted Prior Art, Applicant's internal files.
Color photograph of Armstrong bicycle, Applicant Admitted Prior Art, Applicant's Internal Files.
Color photograph of Armstrong motor cycle, Applicant Admitted Prior Art, Applicant's internal files.
Copending U.S. Appl. No. 16/125,085, filed Sep. 7, 2018.
Copending U.S. Appl. No. 16/141,277, filed Sep. 25, 2018.
Copending U.S. Appl. No. 16/141,323, filed Sep. 25, 2018.
Copending U.S. Appl. No. 16/141,887, filed Sep. 25, 2018.
Copending U.S. Appl. No. 16/141,916, filed Sep. 25, 2018.
Copending U.S. Appl. No. 16/153,396, filed Oct. 5, 2018.
Copending U.S. Appl. No. 16/159,069, filed Oct. 12, 2018.
Copending U.S. Appl. No. 16/159,104, filed Oct. 12, 2018.
Copending U.S. Appl. No. 16/159,169, filed Oct. 12, 2018.
Copending U.S. Appl. No. 16/159,252, filed Oct. 12, 2018.
Copending U.S. Appl. No. 16/161,804, filed Oct. 16, 2018.
Anubi et al., "Variable stiffness suspension system", Mechanical Sciences, vol. 4:139-151 (2013), www.mech-sci-net/4/139/2013.

* cited by examiner

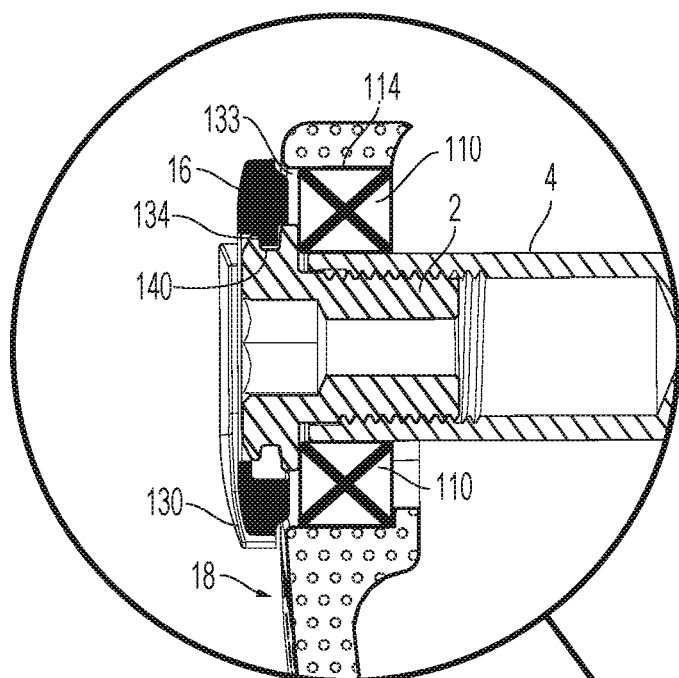
FIG. 10B
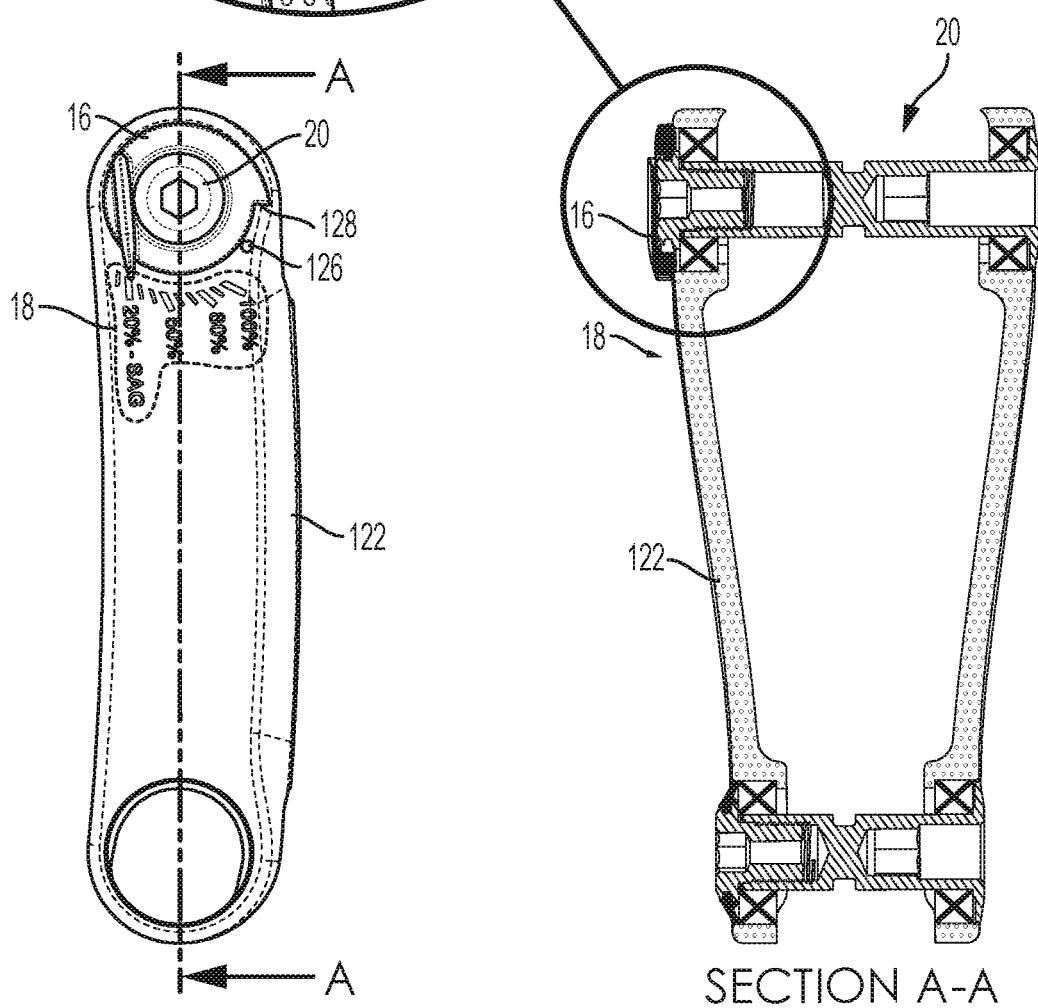
FIG. 9      SECTION A-A      FIG. 10A

CYCLE SUSPENSION WITH ROTATION SENSOR

FIELD OF THE INVENTION

The disclosure is generally directed to wheel suspension assemblies for cycles, and is more specifically directed to wheel suspension assemblies for cycles that include a rotation sensor for measuring angular displacement between two links in the wheel suspension assembly.

BACKGROUND

Suspensions are important components of wheeled vehicles, including cycles. Suspensions allow a wheel to move in a compliant manner, relative to a frame, in response to ground conditions as a rider pilots the vehicle, while improving handling and control during riding. In many cases, suspensions comprise links and pivot assemblies which together form an articulating mechanism which allows a wheel to move. Pivot assemblies allow suspension components such as links to articulate in one or more degrees of freedom, typically via rotation.

Recently, telescopic front suspension forks have dominated suspension systems for two-wheeled vehicles. A telescopic fork includes sliding stanchions connected in a steerable manner to a vehicle frame, and at the same time, includes a telescoping mechanism for wheel displacement. Few, if any, telescopic forks include pivot assemblies.

Linkage front suspensions, comprising links and pivot assemblies, have been attempted in the past as an alternative to telescopic forks, yet they have failed to achieve market acceptance. In contrast, linkages comprising links and pivot assemblies account for almost all the rear suspensions available for two wheeled suspension structures sold today, and almost no examples of solely telescopic or sliding rear suspension structures can be found in today's marketplace.

While linkages including links and pivot assemblies can be economically manufactured, and typically feature very low friction, and linkages are also relatively easy to seal from the elements, many front suspension linkages suffer from poor kinematic performance, usually driven by prioritizing brake dive performance rather than stability.

Telescopic forks on the other hand use sliding stanchions, which require very expensive and tight manufacturing tolerances. Outer surfaces of the stanchion typically slide against bushings to allow for compliance. Front suspension for a cycle is subject to large bending forces fore and aft and less significant lateral forces. Because telescopic forks have relatively large stanchions, and relatively large sliding surfaces and seals, large breakaway friction in the system (known as stiction) is generated by these components. Stiction resists compression of the suspension in reaction to bumps, which is a drawback in a suspension product where the goal is to react to road or terrain conditions, for example by deflecting in response to ground conditions, and/or absorbing impact from bumps. Additionally, as the telescopic fork is loaded in the fore/aft direction (usually on impact or braking), the bushings bind, resulting in even greater stiction at the exact moment when a rider needs the most compliance. Telescopic forks and their large sliding bushings also require smooth stanchion surfaces and significant maintenance and upkeep to keep performance from diminishing quickly.

The quality of cycle suspension performance is correlated to proper setup for the rider. Proper setup for the rider includes adjusting the performance characteristics of certain suspension components to optimize overall ride characteristics, for a rider's weight and ability for example.

Adjusting rider setup on a telescopic fork or rear shock typically involves measuring fork or shock compression, which typically requires two people, one to compress the suspension and the other to measure the suspension displacement with a ruler. This is a difficult, time consuming, and frequently inaccurate method of measuring suspension displacement. External devices such as tape measures adapted for one person suspension displacement measuring have been tried with limited success. Another method involves affixing an o-ring around the stanchion or sliding shaft, and letting the o-ring contact the fork or shock seal. As the suspension compresses, the o-ring is forced along the stanchion or shaft via contact with the fork or shock seal, and then when the suspension is fully extended, the o-ring remains at the compressed position due to friction, and a measurement between measurement between the o-ring and fork or shock seal can be made to determine suspension travel used. Using an o-ring to measure travel is problematic because it can trap dirt and grit against the stanchion or shaft, causing surface damage and further compromising friction, stiction, and suspension performance. Furthermore, o-rings are fragile thin section pieces of rubber that can be easily damaged or degrade over time, and in some cases are impossible or difficult to replace when damaged due to fork or shock construction.

SUMMARY

In accordance with a first embodiment, a suspension assembly for a cycle includes a first link having a first pivot and a second link movably connected to the first link by the first pivot. A rotation sensor is operably connected to the first pivot. The rotation sensor measures angular displacement between the first link and the second link.

In accordance with a second embodiment, a front wheel suspension assembly for a cycle includes a first front suspension link having a first pivot and a second front suspension link movably connected to the first suspension link by the first pivot. A front wheel of a cycle is operably connected to one of the first front suspension link or the second front suspension link. A rotation sensor is operably connected to the first pivot, and the rotation sensor measures angular displacement between the first front suspension link and the second front suspension link.

In accordance with a third embodiment, a suspension assembly for a cycle includes a first link having a first pivot and a second link movably connected to the first link by the first pivot. A shock absorber is operably coupled to the first link or to the second link. The shock absorber includes a damper with a variable orifice.

The first, second, and third embodiments may include any one or more of the following aspects.

In one aspect, the first pivot is a fixed pivot and in another aspect, the first pivot is a floating pivot.

In another aspect, the first link is a fork arm.

In yet another aspect, the rotation sensor comprises one of a magnetic sensor, an optical sensor, an electrical sensor, an accelerometer, a potentiometer, or a resistive sensor.

In yet another aspect, the rotation sensor is one of an optical reflective sensor or an optical interrupter sensor.

In yet another aspect, the rotation sensor is one of a variable reluctance sensor, an eddy current killed oscillator sensor, a Wiegand sensor, or a Hall effect sensor.

In accordance with a fourth embodiment, a method for adjusting a suspension assembly for a cycle includes providing a suspension assembly including a first link having a first pivot, a second link movably connected to the first link by the first pivot, and a rotation sensor operably connected to the first pivot. The rotation sensor measures a first angular relationship between the first link and the second link when the suspension assembly is in an uncompressed state. The first angular relationship is output to a processor. The suspension assembly is moved into a compressed state. The rotation sensor measures a second angular relationship between the first link and the second link in the compressed date. The second angular relationship is output to the processor. A difference between the first angular relationship and the second angular relationship is calculated in the processor to determine a setpoint value for a component of the suspension assembly. The setpoint value from the processor is output to a display. A component of the suspension assembly is adjusted based on the setpoint value.

The fourth embodiment may include any one or more of the following aspects.

In one aspect, the first pivot is a fixed pivot and in another aspect, the first pivot is a floating pivot.

In another aspect, the first link is a fork arm.

In yet another aspect, the rotation sensor comprises one of a magnetic sensor, an optical sensor, an electrical sensor, an accelerometer, a potentiometer, or a resistive sensor.

In yet another aspect, the rotation sensor is one of an optical reflective sensor or an optical interrupter sensor.

In yet another aspect, the rotation sensor is one of a variable reluctance sensor, an eddy current killed oscillator sensor, a Wiegand sensor, or a Hall effect sensor.

In yet another aspect, the step of adjusting the component includes changing a characteristic of a shock absorber, a damper, or a combination of a shock absorber and a damper, based on the setpoint value.

In yet another aspect, the characteristic is a fluid flow rate through an orifice.

In yet another aspect, a size of the orifice is changed based on the setpoint value.

In yet another aspect, the step of adjusting the component includes changing a characteristic of one of a gas spring or a coil spring.

In yet another aspect, the characteristic is a spring constant.

In yet another aspect, the spring constant is changed by varying gas pressure in the gas spring.

In yet another aspect, the gas pressure is varied by changing an internal volume of the gas spring

BRIEF DESCRIPTION OF THE DRAWINGS

FIG. 9 is a side view of a link and a passive travel indicator of the front wheel assembly of FIG. 2.

FIG. 10A is a cross-sectional top view of the link of FIG. 9, including a pivot assembly, taken along line A-A of FIG. 9.

FIG. 10B is a close-up cross-sectional view of the pivot assembly and travel indicator of FIG. 9.

DETAILED DESCRIPTION

The present invention is not limited to the specific embodiments described below, which are intended as exemplary illustrations of individual aspects of the invention. Functionally equivalent methods and components fall within the scope of the invention. Various modifications of the invention, in addition to those shown and described herein, will be apparent to those skilled in the art from the foregoing description. Such modifications are intended to fall within the scope of the appended claims. Throughout this application, the singular includes the plural and the plural includes the singular, unless indicated otherwise. The words "formed," "provided," "disposed," and "located" are used interchangeably to denote relative positioning in the instant description. All cited publications, patents, and patent applications are herein incorporated by reference in their entirety.

The disclosed rotation sensor may be combined with multi-link cycle suspension assemblies, such as the suspension assemblies described in U.S. patent application Ser. No. 15/661,821, filed on Jul. 27, 2017; and the disclosed rotation sensor may be used in conjunction with pivot assemblies such as the pivot assemblies described in U.S. patent application Ser. No. 16/153,396, filed on Oct. 5, 2018. Each of U.S. patent application Ser. Nos. 15/661,821 and 16/153,396 are hereby incorporated by reference herein.

Figure 1:
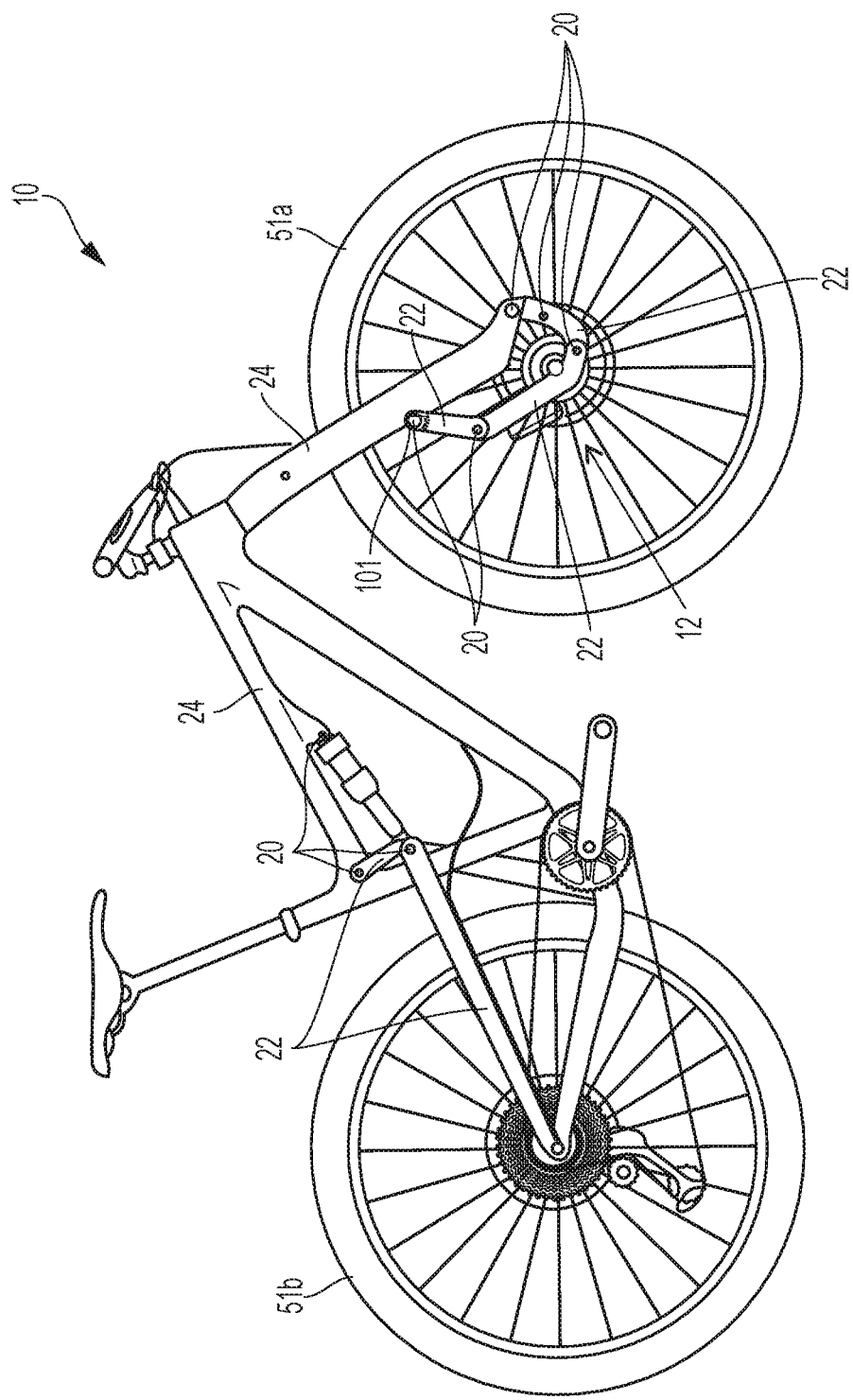
FIG. 1 is a side view of a cycle including a front wheel suspension assembly and a rear wheel suspension assembly constructed according to the teachings of the disclosure.

Turning now to FIG. 1, a cycle 10 includes a front wheel 51*a* and a rear wheel 51*b*, and a front wheel suspension assembly 12 including one or more pivot assemblies 20. While generally identified by the single reference numeral 20 in FIG. 1, specific pivot assemblies may be assigned unique reference numerals in further figures to clarify the location and/or function of unique pivot assemblies. All pivot assemblies identified by unique reference numerals below are pivot assemblies 20 as illustrated in FIG. 1. Additionally, while generally identified by a single reference numeral 22 in FIG. 1, the specific links may be assigned unique reference numerals in further figures to clarify the location and/or function of unique links. All links identified by unique reference numerals bellow are links 22 as illustrated in FIG. 1.

The front wheel suspension assembly 12 also includes a plurality of pivotably connected links 22. One or more of the links 22 may be pivotably connected to a frame member, such as a fork arm 24. The frame member 24 may act as a fixed location for the pivotably connected links 22. As the front wheel 51a moves relative to the frame member, due to changing ground topography/conditions, the links 22 articulate relative to one another, and relative to the frame member 24, thus allowing the front wheel 51a to move relative to the frame member 24 in a compliant manner in response to the changing ground topography/conditions as a rider pilots the cycle 10. The front wheel suspension assembly 12, and thus the links 22, improve handling and control during riding by directing movement of the front wheel 51a relative to the frame member 24 in a predictable and predetermined manner.

A rotation sensor 101 is included on one pivot assembly 20 to measure angular displacement between pivotably connected links 22 during compression of the front wheel suspension assembly 12, thereby providing the rider a measurement that may be used as a basis for making changes to suspension settings (e.g., changes to spring forces in a shock absorber or spring unit and/or to frictional forces in the pivot assembly) in a purposeful manner. As a result of these changes, the performance of the front wheel suspension assembly 12 is altered and improved, thus producing a better riding experience that is customized to the rider according to the manufacturer recommendations and/or a rider's preferences or capabilities. Although the rotation sensor 15 is illustrated in FIG. 1 as being located at a certain pivot 20, in other embodiments, the rotation sensor 15 may be located at any pivot 20 location, and/or at other locations in the front wheel suspension assembly 12.

As used herein, the term "operably connected" or "operable connection" means any direct or indirect connection between two elements. For example, if a first element is directly connected to a first link in a suspension assembly, the first element is "operably connected" to all links in the suspension assembly because the first element is indirectly connected to all links in the suspension assembly by the direct connection to the first link.

Figure 2:
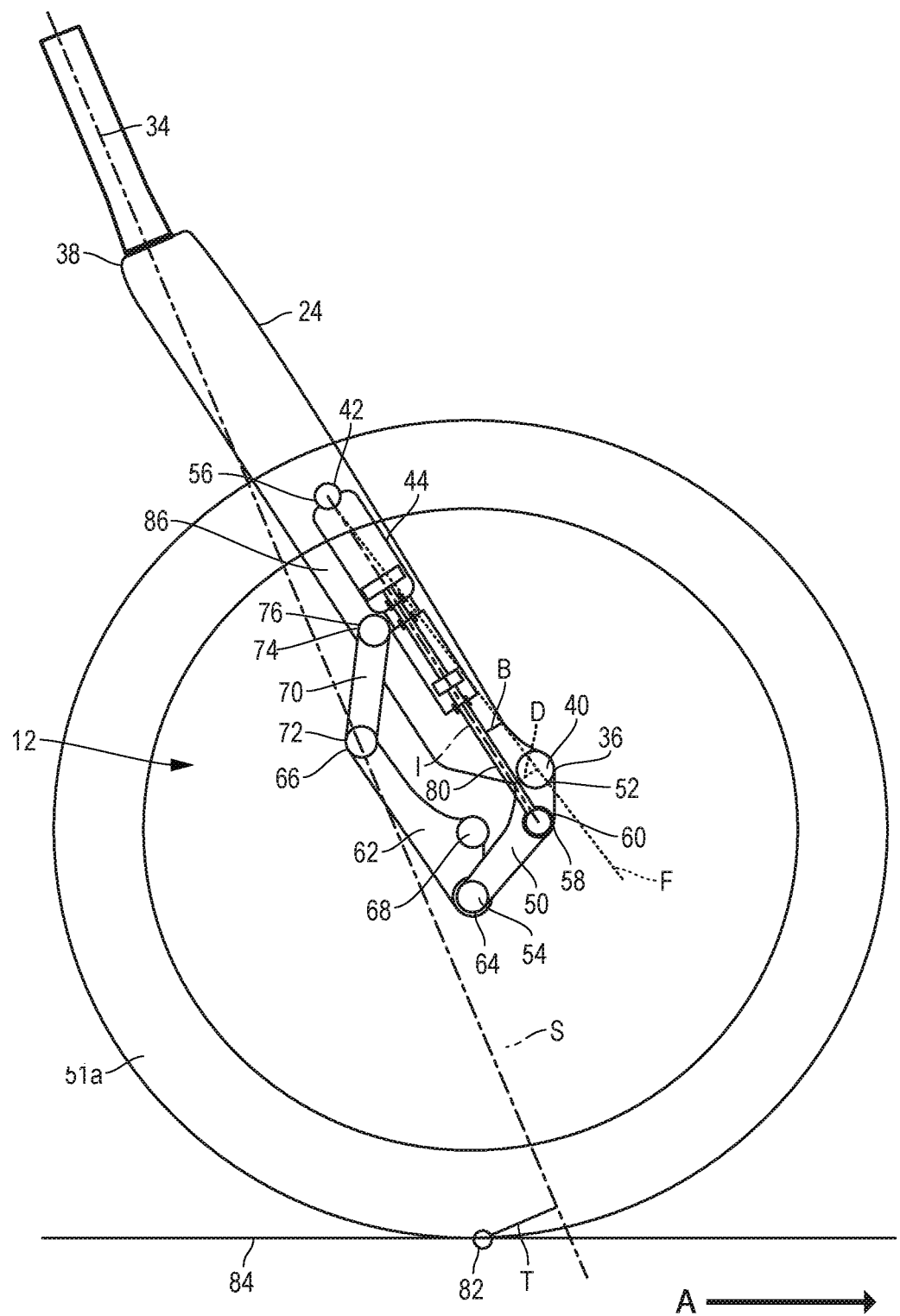
FIG. 2 is a side view of the front wheel assembly of FIG. 1.

As illustrated in FIG. 2, the fork arm 24 is operably connected to a steering shaft 34. The steering shaft 34 includes a steering axis S that is formed by a central axis of the steering shaft 34. The fork arm 24 has a first end and 36 a second end 38, the fork arm 24 including a fork arm fixed pivot 40 and a fork arm shock pivot 42. The fork arm shock pivot 42 operably connects a suspension device, such as a shock absorber 44 to the fork arm 24. The shock absorber 44 is considered to be operably connected to (or to form an operable connection with) any link 22 in the front wheel suspension assembly 12 when the shock absorber 44 is directly connected to one link 22 in the front wheel suspension assembly 12. In other words, the shock absorber 44 is directly connected to one link 22 and indirectly connected to every other link 22 in the front wheel suspension assembly, and thus operably connected to (or forms an operable connection with) all links 22 in the front wheel suspension assembly 12. For example, the fork arm shock pivot 42 allows relative motion, in this case rotation, between the shock absorber 44 and the fork arm 24. In other embodiments, other types of relative motion, such as flexure or translation, between the shock absorber 44 and the fork arm 24 may be employed. The fork arm fixed pivot 40 pivotably connects one element of the front wheel suspension assembly 12, as discussed further below, to the fork arm 24.

A shock link 50 is pivotably connected to the first arm fixed pivot 40. The shock link 50 includes a shock link fixed pivot 52 and a shock link floating pivot 54 spaced apart from one another along a length of the shock link 50. The shock link 50 is pivotably connected to the fork arm fixed pivot 40 at the shock link fixed pivot 52 such that the shock link 50 is rotatable about the shock link fixed pivot 52 and the shock link fixed pivot 52 remains in a fixed location relative to the fork arm 24, while the shock link floating pivot 54 is movable relative to the fork arm 24.

A pivot, as used herein, includes any connection structure that may be used to operably connect one element to another element, and that allows relative movement between the connected components. An operative connection may allow for one component to move in relation to another while constraining movement in one or more degrees of freedom. For example, the one degree of freedom may be pivoting about an axis. In one embodiment, a pivot may be formed from a journal or through hole in one component and an axle in another component. In other examples, pivots may include ball and socket joints. Yet other examples of pivots include, but are not limited to singular embodiments and combinations of, compliant mounts, sandwich style mounts, post mounts, bushings, bearings, ball bearings, plain bearings, flexible couplings, flexure pivots, journals, holes, pins, bolts, and other fasteners. Also, as used herein, a fixed pivot is defined as a pivotable structure that does not change position relative the fork arm 24. As used herein, a floating pivot is defined as a pivot that is movable (or changes position) relative to another element, and in this case, is movable relative to fork arm 24. Some examples of pivot structures are further discussed with reference to FIG. 12 below.

The linkage or front wheel suspension assembly 12 is configured in a trailing orientation. A trailing orientation is defined herein as a linkage that includes a fixed pivot that is forward of the corresponding floating pivot when the cycle is traveling in the forward direction of travel as represented by arrow A in FIG. 2. In other words, the floating pivot trails the fixed pivot when the cycle is traveling in the forward direction of travel. For example, in the illustrated embodiment, the shock link fixed pivot 52 is forward of the shock link floating pivot 54. The disclosed linkage or suspension assembly 12 is also characterized as a multi-link or multi-bar suspension assembly. A multi-link suspension assembly is defined herein as a suspension assembly having a plurality of interconnected links in which any part of the front wheel 51a is directly connected to a link in the plurality of interconnected links that is not directly connected to the fork arm 24.

Figure 3:
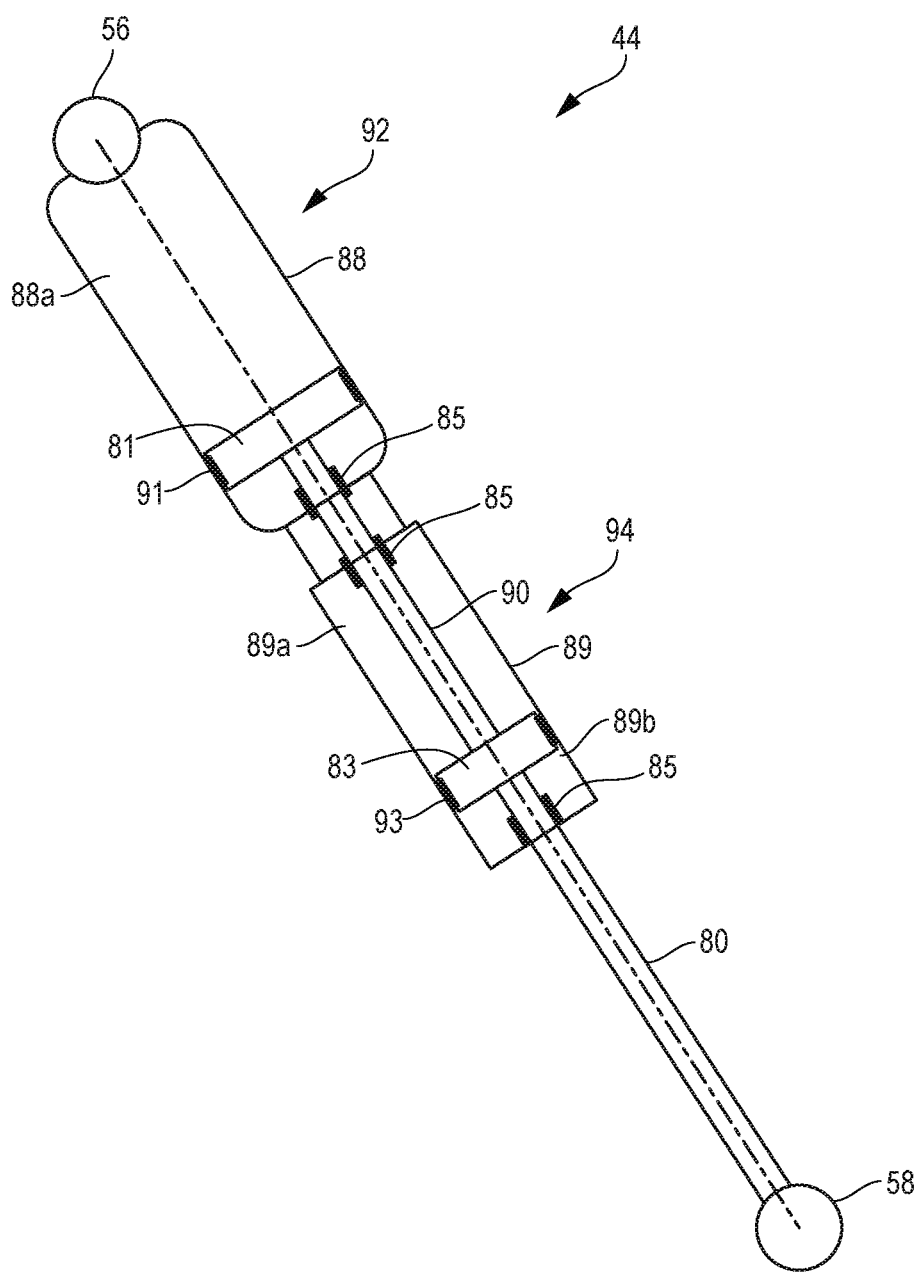
FIG. 3 is a side view of a shock absorber of the front wheel assembly of FIG. 2.

Turning now to FIG. 3, the shock absorber 44 includes a first shock mount 56 and a second shock mount 58, the first shock mount 56 being pivotably connected to the fork arm shock pivot 42, the second shock mount 58 being pivotably connected to a shock connection pivot 60 located between the shock link fixed pivot 52 and the shock link floating pivot 54 along a length of the shock link 50. The shock absorber 44 includes a spring, such as a gas spring 92 having a spring body 88 (other embodiments may include other types of springs, such as a coil spring), a damper 94 having a damper body 89, an inshaft 80, and outshaft 90, a damper piston 83, a gas piston 81, and a shaft seal 85. In the art, a damper may also be referred to as a dashpot and a gas spring may also be referred to as a mechanical spring.

The inshaft 80 and outshaft 90 can comprise a singular component or plurality of components, and may be combined with other components. In some embodiments, the damper piston 83 may be connected to or include a portion or the entirety of the inshaft 80 or outshaft 90. In some embodiments, the damper piston 83 has a greater radial cross-sectional area than the inshaft 80 or the outshaft 90. The inshaft 80 and outshaft 90 can extend between and through a shaft seal 85 to operably connect a gas spring with a damper to provide concurrent movement of the inshaft 80, outshaft 90, gas piston 81, and damper piston 83 during suspension compression and extension.

The spring body 88 may include a gas chamber 88a, which is pressurized with a gas. The pressurized gas biases the gas piston 81 towards the damper body 89. The pressure of the gas within the gas chamber 88a may be changed, as discussed further below, by either changing the volume of the gas chamber 88a, or by adding or subtracting gas molecules to/from the gas chamber 88a, to adjust a setpoint of the front wheel suspension assembly 12 according to rider ability or characteristics.

The damper body 89 may include a first fluid chamber 89a and a second fluid chamber 89b, and a damping fluid. The damping fluid moves between the first fluid chamber 89a and the second fluid chamber 89b, which are separated by a flow control device, such as a flow restriction or a variable orifice (see FIG. 4) thus creating a resistive or damping force in a direction opposite to the movement of the damper piston 83. In other embodiments, the first fluid chamber 89a and the second fluid chamber 89b may be located on one side of the damper piston 83 and separated by a flow control device, and in other embodiments, the first fluid chamber 89a and the second fluid chamber 89b may be fluidly connected by an external flow control device.

Dampers can be dry-friction, or hydraulically based with fluid elements. Dampers dissipate motion energy in the front wheel suspension assembly 12 by producing a force that opposes the direction of motion. Generally, hydraulic dampers include two or more fluid chambers. Fluid moves from one chamber to the other during movement of a piston. Generally, one chamber experiences high pressure during compression and the other chamber experiences high pressure during extension or rebound. As fluid moves between the two chambers, it passes through a flow control device, such as a flow restriction. As the fluid moves through the flow restriction, cavitation can occur due to pressure differences. Increasing the pressure of the oil can reduce cavitation. The oil pressure may be increased by applying force from a spring, such as a gas spring, to the damper stem. For example, in the disclosed embodiment, the gas spring 92 is connected to the outshaft 90, which is connected to the damper piston 83.

In one embodiment, the damper 94 may comprise a twin-tube damper. In other embodiments, the damper 94 may comprise a through-rod telescopic damper, a single tube telescopic damper, or a single tube telescopic damper with a compression piston. Some examples of single tube and twin-tube dampers may be found in "Development of software that can predict damper curves on shock absorbers," Uppsala Universitet, Examensarbete 15 hp, June 2013; "Understanding your Dampers: A guide from Jim Kasprzak," www kaztechnolgies.com; "Flow control valves," Hydraulics and Pneumatics, Jan. 1, 2012, http://hydraulicspneumatics.com/200/TechZone/HydraulicValves/Article/False/6409/TechZone-HydraulicValves; and "The Shock Absorber Handbook," John C. Dixon, Chichester, England, John Wiley, 2007; each of which is hereby incorporated by reference herein.

In some embodiments, the flow control device may comprise a flow restriction such as a narrow passageway. In other embodiments, the flow control device may comprise a variable orifice having an orifice or passageway with a variable cross-sectional area. In other embodiments, the flow control device may comprise a valve, such as a calibrated needle valve. In yet other embodiments, the flow control device may comprise a fluid control regulator. In yet other embodiments, the flow control device may comprise an electrohydraulic valve with a closed loop feedback.

In some embodiments, the flow control device may be located in the damper piston, which is sometimes called a piston valve. In other embodiments, the flow control device may be located between two chambers that are not separated by the piston, this location is sometimes called a foot valve. In other embodiments, the damper may include more than one flow control device, each flow control device targeting a different flow characteristic, such as one flow control device that targets a high speed characteristic and another flow control device that targets a low speed characteristic.

Figure 4:
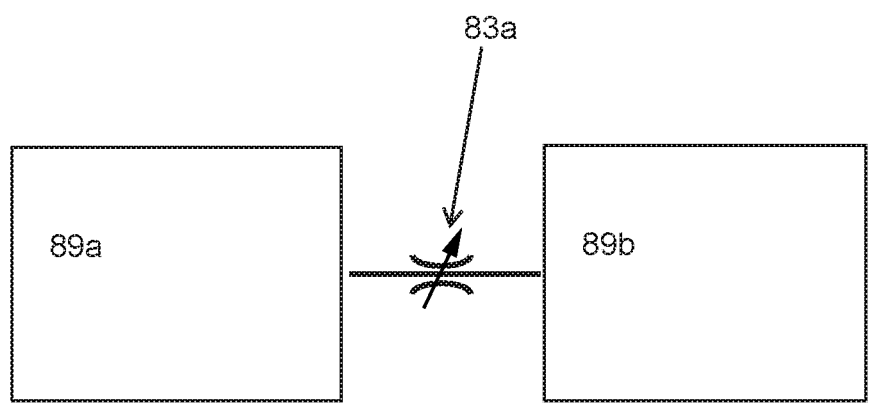
FIG. 4 is a schematic diagram of two fluid chambers in a damper separated by a flow control device.

Turning now to FIG. 4, a schematic diagram of the first and second fluid chambers 89a, 89b is illustrated. The first and second fluid chambers 89a, 89b are fluidly connected and are separated by the flow control device, such as a variable orifice 83a.

The pressure of the gas in the gas chamber 88a and the flow control device may be adjusted to change the performance characteristics (or setup) of the front wheel suspension assembly 12, as further discussed below.

The damper piston mates to or includes a damper piston seal 93. In some embodiments, the damper piston seal 93 may comprise; multiple, or combinations of glide ring, wear band, o-ring. X-ring, Q ring, quad ring, Teflon seal, cap seal, piston ring, solid piston, T seal, V ring, U cup, urethane seal, PSQ seal, preloaded piston band, or other type of band or seal. The damper piston seal 93 is intended to seal damping fluid between each side of the damper piston 83, while allowing axial movement of the damper piston 83 and therefore axial movement of the inshaft 80 and/or outshaft 90.

In certain embodiments, the gas spring 92 has certain advantages over other types of springs. The gas spring 92 uses a pressurized gas such as air, nitrogen, or other gases to act on the area of a gas piston 81, which results in a force against the gas piston 81. In certain embodiments, a user can change the gas pressure and therefore the force output at the gas piston 81. This allows the user to tailor output force based on preferences or to meet the requirements of varying road conditions. In certain embodiments, a gas spring 92 may comprise pressures that can act on both sides of the gas piston 81. By varying the volume of gas acting on each side of the gas piston 81 and the area of each side of the gas piston 81, one can vary the amount of force output at the gas piston 81 at various points in the damper displacement. This variability can be a valuable tool for allowing the user to tailor output force based on their preference or to meet the requirements of varying road conditions.

The gas piston 81 can be connected to or include a portion or the entirety of the inshaft 80 or outshaft 90. In preferred embodiments, the gas piston 81 has a greater radial cross-sectional area than the inshaft 80 or the outshaft 90. In certain other preferred embodiments, the gas piston 81 has a greater radial cross-sectional area than the damper piston 83. The gas piston 81 mates to or includes a gas piston seal 91. In some embodiments, the gas piston seal 91 may comprise; singular, multiple, or combinations of glide ring, wear band, o-ring. X-ring, Q ring, quad ring, Teflon seal, cap seal, piston ring, solid piston, T seal, V ring, U cup, urethane seal, PSQ seal, preloaded piston band, or other type of band or seal. The gas piston seal 91 is intended to seal gas between each side of the gas piston 81, while allowing axial movement of the gas piston 81 and therefore axial movement of the inshaft 80 and/or outshaft 90.

The shock absorber 44 includes the shaft seals 85. The shaft seals 45 are used to seal damping fluid or gas inside the damper body 89 or spring body 88 while allowing axial movement of an inshaft 80 and/or outshaft 90. The shaft seals 45 can be located at one end of a spring body 88, while sealing gas inside the spring body 88 and allowing axial movement of an inshaft 80 or outshaft 90. The shaft seals 45 can be located at one or more ends of a damper body 89, while sealing damping fluid inside the damper body 89 and allowing axial movement of an inshaft 80 or outshaft 90.

Returning now to FIG. 2, a wheel carrier 62 includes a wheel carrier first pivot 64 and a wheel carrier second pivot 66 spaced apart from one another along a length of the wheel carrier 62. Both the wheel carrier first pivot 64 and the wheel carrier second pivot 66 are floating pivots, as they both move relative to the first arm 32. A wheel mount 68 is adapted to be connected to a center of a wheel, for example the front wheel 51*a*. In the disclosed embodiment, a center of the front wheel 51*a* is rotatably connected to the wheel mount 68. The wheel carrier first pivot 64 is pivotably connected to the shock link floating pivot 54 so that the wheel carrier second pivot 66 is pivotable about the wheel carrier first pivot 64 relative to the shock link floating pivot 54.

A control link 70 includes a control link floating pivot 72 and a control link fixed pivot 74. The control link floating pivot 72 is pivotably connected to the wheel carrier second pivot 66, and the control link fixed pivot 74 is pivotably connected to a fork arm control pivot 76 located on the fork arm 24 such that the control link floating pivot 72 is pivotable about the control link fixed pivot 74, which remains in a fixed location relative to the fork arm control pivot 76.

In some embodiments, the shock connection pivot 60 is closer to the shock link fixed pivot 52 than to the shock link floating pivot 54, as illustrated in FIG. 2. As a function of suspension compression and link movement, a perpendicular distance D between a central axis I of an inshaft 80 of the shock absorber 44 and a center of the shock link fixed pivot 52 varies as the shock absorber 44 is compressed and extended, as the shock absorber pivots about the first shock mount 56. This pivoting and varying of the perpendicular distance D allows the leverage ratio and motion ratio to vary as the shock absorber 44 compresses and extends. As a function of suspension compression and link movement, a mechanical trail distance T varies as the shock absorber 44 compresses and extends. The mechanical trail distance T is defined as the perpendicular distance between the steering axis S and the contact point 82 of the front wheel 51*a* with the ground 84. More specifically, as the suspension compresses, beginning at a state of full extension, the mechanical trail distance T increases, thus increasing stability during compression. Compression is usually experienced during braking, cornering, and shock absorbing, all of which benefit from increased stability that results from the mechanical trail distance increase.

Mechanical trail (or "trail", or "caster") is an important metric relating to handling characteristics of two-wheeled cycles. Mechanical trail is a configuration in which the wheel is rotatably attached to a fork, which has a steering axis that is offset from the contact point of the wheel with the ground. When the steering axis is forward of the contact point, as in the case of a shopping cart, this configuration allows the caster wheel to follow the direction of cart travel. If the contact point moves forward of the steering axis (for example when reversing direction of a shopping cart), the directional control becomes unstable and the wheel spins around to the original position in which the contact point trails the steering axis. The friction between the ground and the wheel causes a self-righting torque that tends to force the wheel to trail the steering axis. The greater the distance between the contact point and perpendicular to the steering axis, the more torque is generated, and the greater the stability of the system. Similarly, the longer the distance between the cycle wheel contact point and perpendicular to the steering axis, the more torque is generated, and the greater the stability of the system. Conversely, the shorter the distance between the cycle wheel contact point and perpendicular to the steering axis, the less torque is generated, and the lower the stability of the system.

This caster effect is an important design characteristic in cycles. Generally, the caster effect describes the cycle rider's perception of stability resulting from the mechanical trail distance described above. If the wheel gets out of line, a self-aligning torque automatically causes the wheel to follow the steering axis again due to the orientation of the wheel ground contact point being behind the steering axis of the fork. As the contact point of the wheel with the ground is moved further behind the steering axis, self aligning torque increases. This increase in stability is referred to herein as the caster effect.

In the disclosed front wheel suspension assembly 12, when the suspension is at a state of full extension, the steering axis of the fork 30 projects ahead of the contact point 82. As the suspension assembly moves towards a state of full compression, the steering axis S projects farther ahead of the contact point 82, which results in the stability increasing. This increased stability stands in contrast to known telescopic fork cycles, which experience reduced trail and thus reduced stability during compression.

Leverage ratios or motion ratios are important metrics relating to performance characteristics of some suspensions. In certain embodiments, a shock absorber can be compressed at a constant or variable rate as the suspension moves at a constant rate towards a state of full compression. As a wheel is compressed, incremental suspension compression distance measurements are taken. Incremental suspension compression distance is measured from the center of the wheel at the wheel rotation axis and parallel with the steering axis, starting from a state of full suspension extension, and moving towards a state of full suspension compression. These incremental measurements are called the incremental suspension compression distance. A shock absorber length can be changed by wheel link, and/or brake link, and/or control link movements as the suspension compresses. At each incremental suspension compression distance measurement, a shock absorber length measurement is taken. The relationship between incremental suspension compression distance change and shock absorber length change for correlating measurements of the suspension's compression is called leverage ratio or motion ratio. Leverage ratio and motion ratio are effectively equivalent but mathematically different methods of quantifying the effects of variable suspension compression distance versus shock compression distance. Overall leverage ratio is the average leverage ratio across the entire range of compression. Overall leverage ratio can be calculated by dividing the total suspension compression distance by the total shock absorber compression distance. Overall motion ratio is the average motion ratio across the entire range of compression. Overall motion ratio can be calculated by dividing the total shock absorber compression distance by the total suspension compression distance.

Generally, a suspended wheel has a compressible wheel suspension travel distance that features a beginning travel state where the suspension is completely uncompressed to a state where no further suspension extension can take place, and an end travel state where a suspension is completely compressed to a state where no further suspension compression can take place. At the beginning of the wheel suspension travel distance, when the suspension is in a completely uncompressed state, the shock absorber is in a state of least compression, and the suspension is easily compressed. As the suspended wheel moves compressively, force at the wheel changes in relation to shock absorber force multiplied by a leverage ratio. A leverage ratio is defined as the ratio of compressive wheel travel change divided by shock absorber measured length change over an identical and correlating given wheel travel distance. A motion ratio is defined as the ratio of shock absorber measured length change divided by compressive wheel travel change over an identical and correlating given wheel travel distance.

In known telescopic forks no leverage ratio exists and, the leverage ratio is always equivalent to 1:1 due to the direct coupling of the wheel to the shock absorber.

A leverage ratio curve is a graphed quantifiable representation of leverage ratio versus wheel compression distance or percentage of full compression distance. Wheel compression distance, suspension compression, or wheel travel is measured from the center of the wheel at the wheel rotation axis and parallel with the steering axis, with the initial 0 percent measurement taken at full suspension extension with the vehicle unladen. As a suspension is compressed from a state of full extension to a state of full compression at a constant rate, measurements of shock absorber length are taken as the shortest distance between a first shock pivot and a second shock pivot at equal increments of suspension compression. When graphed as a curve on a Cartesian graph, leverage ratio is shown on the Y axis escalating from the x axis in a positive direction, and vertical wheel travel is shown on the X axis escalating from the Y axis in a positive direction.

A motion ratio curve is a graphed quantifiable representation of motion ratio versus wheel compression distance or percentage of full compression distance. Wheel compression distance, suspension compression, or wheel travel is measured from the center of the wheel at the wheel rotation axis and parallel with the steering axis, with the initial 0 percent measurement taken at full suspension extension with the vehicle unladen. As a suspension is compressed from a state of full extension to a state of full compression, measurements of shock absorber length are taken as the shortest distance between a first shock pivot and a second shock pivot at equal increments of suspension compression. When graphed as a curve on a Cartesian graph, motion ratio is shown on the Y axis escalating from the x axis in a positive direction, and vertical wheel travel is shown on the X axis escalating from the Y axis in a positive direction.

In certain embodiments, a leverage ratio or motion ratio curve can be broken down into three equal parts in relation to wheel compression distance or vertical wheel travel, a beginning ⅓ (third), a middle ⅓, and an end ⅓. In certain embodiments, a beginning ⅓ can comprise a positive slope, zero slope, and or a negative slope. In certain embodiments, a middle ⅓ can comprise a positive slope, zero slope, and or a negative slope. In certain embodiments, an end ⅓ can comprise a positive slope, zero slope, and or a negative slope. Certain preferred leverage ratio embodiments can comprise a beginning ⅓ with a positive slope, a middle ⅓ with a less positive slope, and an end ⅓ with a more positive slope. Certain preferred leverage ratio embodiments can comprise a beginning ⅓ with a negative slope, a middle ⅓ with negative and zero slope, and an end ⅓ with a positive slope. Certain preferred leverage ratio embodiments can comprise a beginning ⅓ with a positive and negative slope, a middle ⅓ with negative and zero slope, and an end ⅓ with a positive slope. Certain preferred leverage ratio embodiments can comprise a beginning ⅓ with a positive and negative slope, a middle ⅓ with negative and zero slope, and an end ⅓ with a more negative slope. Certain preferred motion ratio embodiments can comprise a beginning ⅓ with a negative slope, a middle ⅓ with a less negative slope, and an end ⅓ with a more negative slope. Certain preferred motion ratio embodiments can comprise a beginning ⅓ with a positive slope, a middle ⅓ with positive and zero slope, and an end ⅓ with a negative slope. Certain preferred motion ratio embodiments can comprise a beginning ⅓ with a negative and positive slope, a middle ⅓ with positive and zero slope, and an end ⅓ with a negative slope. Certain preferred motion ratio embodiments can comprise a beginning ⅓ with a negative and positive slope, a middle ⅓ with positive and zero slope, and an end ⅓ with a more positive slope.

In contrast to telescopic suspensions, the disclosed front wheel suspension assembly 12 provides a greater than 1:1 overall leverage ratio between the shock absorber 44 and the shock link 50, due to the indirect coupling of the front wheel 51*a* and the shock absorber 44. Additionally, because of the movement arcs of the various linkage elements, at any given point during compression, instantaneous leverage ratio and motion ratio can vary non-linearly.

The central axis I of the inshaft 80 of the shock absorber 44 is arranged to form an angle B of between 0° and 20° relative to a central axis F of the fork arm 24, the central axis F of the fork arm 24 being defined by a line formed between the fork arm shock pivot 42 and the fork arm fixed pivot 40. In other embodiments, the central axis I of the inshaft 80 of the shock absorber 44 forms an angle with the central axis F of the fork arm 24 of between 0° and 15°. In other embodiments, the central axis I of the inshaft 80 of the shock absorber 44 forms an angle with the central axis F of the fork arm 24 of between 0° and 30°. The angle B may vary within these ranges during compression and extension.

In some embodiments, the fork arm 24 includes a hollow portion 86 and the shock absorber 44 is located at least partially within the hollow portion 86 of the fork arm 24.

The shock link fixed pivot 52 is offset forward of the central axis I of the inshaft 80 of the shock absorber 44. In other words, the central axis I of the inshaft 80 of the shock absorber 44 is positioned between the shock link fixed pivot 52 and the shock link floating pivot 54 in a plane defined by the central axis I of the inshaft 80, the shock link fixed pivot 52 and the shock link floating pivot 54 (i.e., the plane defined by the view of FIG. 2).

A line between the wheel carrier first pivot 64 and the wheel carrier second pivot 66 defines a wheel carrier axis WC, and the wheel mount 68 is offset from the wheel carrier axis WC in a plane defined by the wheel carrier axis WC and the wheel mount 68 (i.e., the plane defined by the view of FIG. 2). In some embodiments, the wheel mount 68 is offset from the wheel carrier axis WC towards the fork arm 24, for example the embodiment illustrated in FIG. 2. In other embodiments, the wheel mount 68 may be offset from the wheel carrier axis WC away from the fork arm 24. In yet other embodiments, the wheel mount 68 may lie on the wheel carrier axis WC.

In the embodiment of FIG. 2, the wheel mount 68 is located aft of the shock link fixed pivot 52, such that the central axis I of the inshaft 80 of the shock absorber 44 is located between the wheel mount 68 and the shock link fixed pivot 52 in a plane defined by the central axis I of the inshaft 80 of the shock absorber 44, the wheel mount 68 and the shock link fixed pivot 52 (i.e., the plane defined by the view of FIG. 2).

Returning to FIG. 3, the shock absorber 44 may include an inline shock absorber having a damper body 89 and a spring body 88 that are sequentially arranged along a substantially common central axis.

The damper body 89 and the spring body 88 shall be considered to be inline and arranged sequentially along a substantially common central axis when a central axis of the spring body 88 and a central axis of the damper body 89 are offset from one another by a maximum of 100% of the outside diameter of an inshaft 80. In other embodiments, the damper body 89 and the spring body 88 are offset from one another by a maximum of 50% of the outside diameter of the inshaft 80. In other embodiments, the damper body 89 and the spring body 88 are offset from one another by a maximum of 33% of the outside diameter of the inshaft 80. In yet other embodiments, the damper body 89 and the spring body 88 are offset from one another by a maximum of 25% of the outside diameter of the inshaft 80. In a preferred embodiment, the damper body 89 and the spring body 88 share a common central axis.

The inshaft 80 extends from the damper body 89, and an outshaft 90 extends through the damper body 89 and into the spring body 88. The second shock mount 58 is formed at one end of the inshaft 80, and the inshaft 80 is pivotably connected to the shock connection pivot 60 by the second shock mount 58 such that the inshaft 80 and the outshaft 90 are compressible and extendable relative to the damper body 89 as the shock link 50 pivots about the shock link fixed pivot 52. In the embodiments of FIG. 3, the damper body 89 is located between the spring body 88 and the second shock mount 58. In other embodiments, the spring body may be located between the damper body and the second shock mount.

Returning now to FIG. 2, the control link 70 is pivotably mounted to the fork arm 24 at the fork arm control pivot 76 that is located between the fork arm fixed pivot 40 and the fork arm shock pivot 42, along a length of the fork arm 24.

Figure 5:
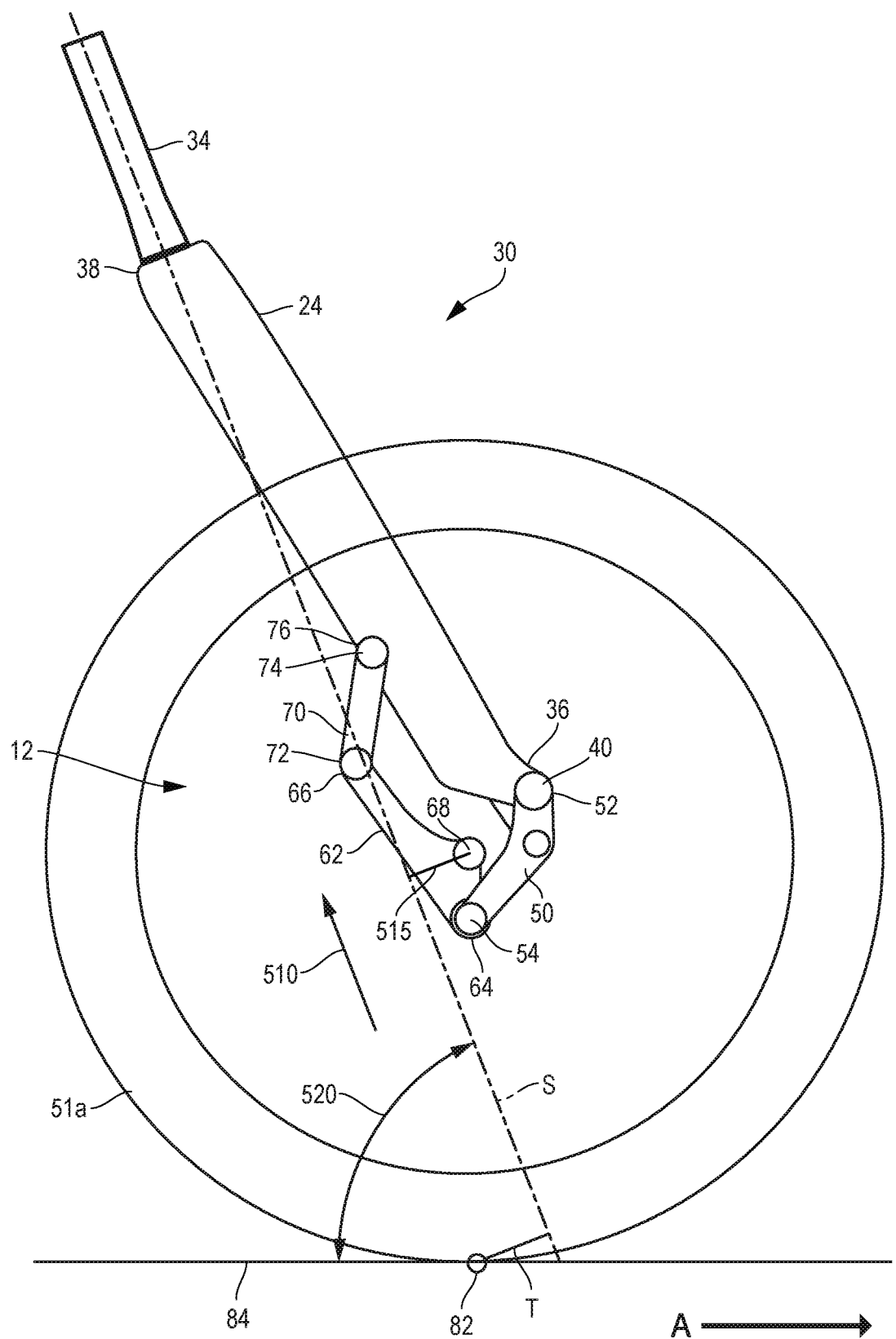
FIG. 5 is side view of the front wheel assembly of FIG. 2 in an uncompressed state.
Figure 6:
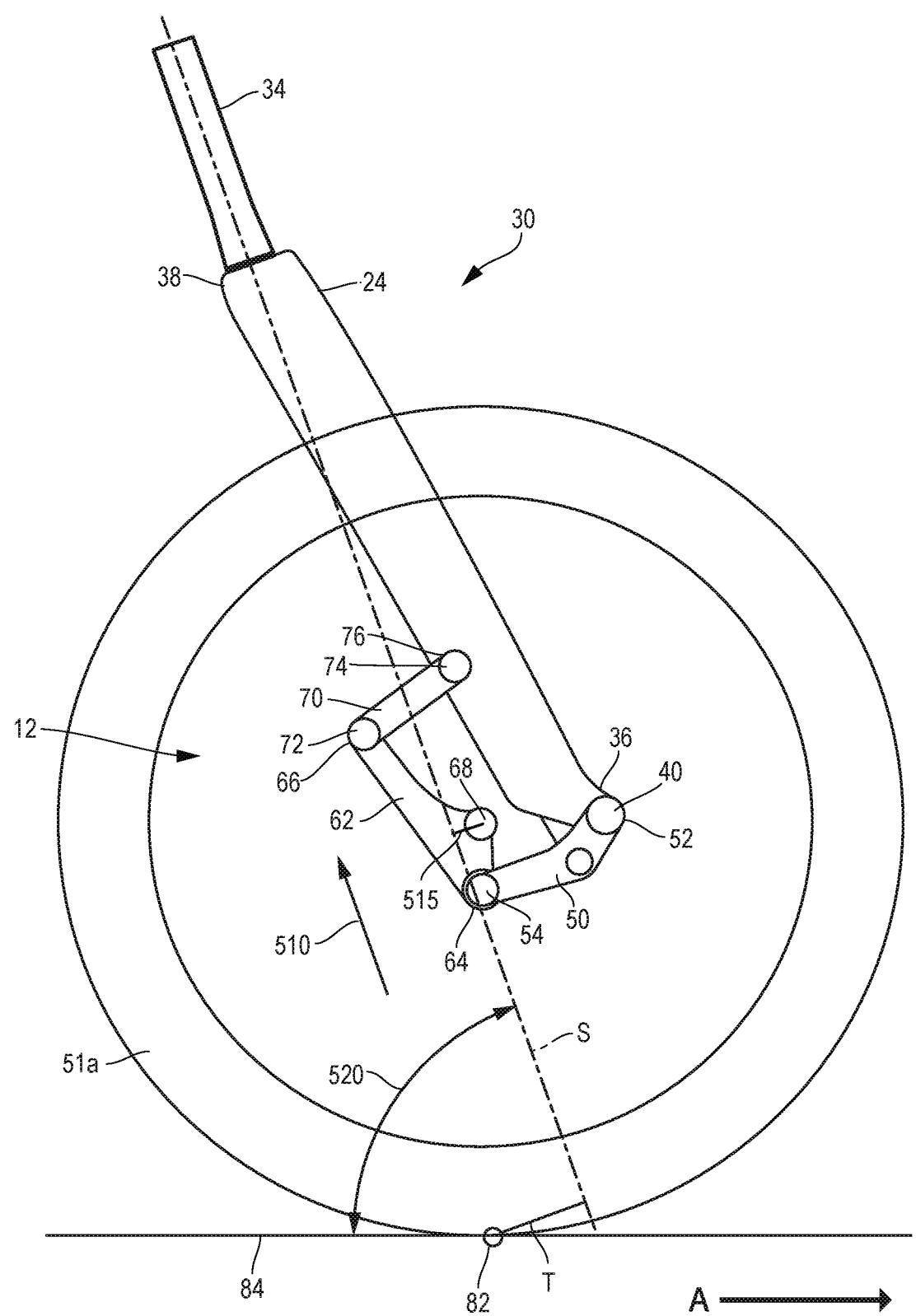
FIG. 6 is a side view of the front wheel assembly of FIG. 2 in a partially compressed state.
Figure 7:
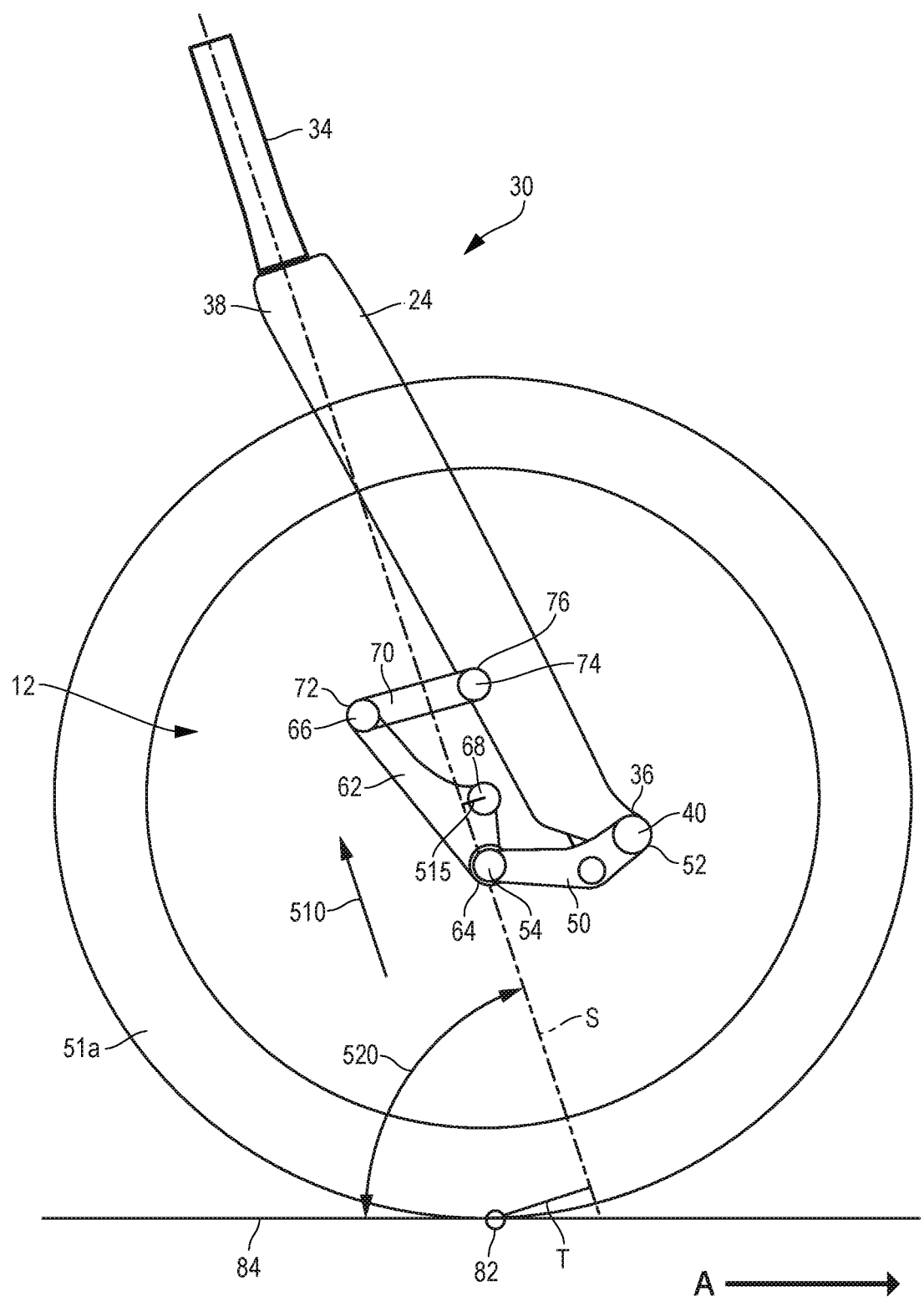
FIG. 7 is a side view of the front wheel assembly of FIG. 2 in a further compressed state.

Turning to FIGS. 5-7, generally, as the front wheel suspension assembly 12 initially compresses (e.g., one or more links in the suspension assembly has a component of movement in a direction 510 that is substantially parallel to the steering axis S), a mechanical trail distance T initially increases due to the angular change in the steering axis S, which projects a bottom of the steering axis forward, relative to the wheel contact point 82 with the ground 84. This increase in mechanical trail distance T also increases the caster effect by creating a larger moment arm, between the steering axis 82 and the wheel contact point 82, to correct off-center deflections of the front wheel 51a. As a result, the front wheel 51a becomes more statically and dynamically stable as the front wheel suspension assembly 12 compresses and the mechanical trail distance T increases.

For example, for each embodiment disclosed herein, when suspension assembly compression is initiated (relative to an uncompressed state), mechanical trail distance T increases. Mechanical trail distance T may increase, for example continuously increase, from a minimum value in the uncompressed state of the suspension assembly to a maximum value in the fully compressed state of the suspension assembly. In other embodiments, mechanical trail distance T may increase initially from the uncompressed state of the suspension assembly to a maximum value at a partially compressed intermediate state of the suspension assembly, and then mechanical trail distance T may decrease from the maximum value as the suspension assembly continues compression from the partially compressed intermediate state to the fully compressed state.

When the disclosed front wheel suspension assembly 12 is at a fully extended state (e.g., uncompressed), as illustrated in FIG. 5, for example, the steering axis S projects ahead of the contact point 82, where the front wheel 51a contacts the ground 84. In various states of compression between uncompressed and fully compressed, suspension assembly compression can be measured as a component of linear distance that the wheel mount 68 moves in a travel direction 510 aligned with and parallel to the steering axis S. Alternatively, as discussed further below with respect to FIG. 8, suspension assembly compression may be measured as a change in the angular relationship between two links in the suspension assembly.

As the front wheel suspension assembly 12 initially begins to compress, the front wheel suspension assembly 12 moves through a partially compressed intermediate state, as illustrated in FIG. 6. In the partially compressed intermediate state illustrated in FIG. 6, the steering axis S projects farther ahead of the contact point 82 than in the fully extended state of FIG. 5, which results in a decrease of an offset distance 515 of the wheel mount and a corresponding increase in the mechanical trail distance T. In the embodiment of FIGS. 5-7, the offset distance 515, which is defined as the perpendicular distance between the steering axis S and a center of the wheel mount 68 of the front wheel 51a, decreases as the front wheel suspension assembly 12 compresses. The offset distance 515 generally decreases during suspension assembly compression because the wheel mount 68 moves in the aft direction, to the left in FIGS. 5-7. In other embodiments, as the front wheel suspension assembly 12 compresses, beginning at a state of full extension, the offset distance 515 can increase or decrease, during suspension compression, depending on variables including wheel 51a diameter, steering angle 520, and initial mechanical trail distance T.

The mechanical trail distance T is larger in the partially compressed intermediate state of FIG. 6 than in the fully extended state of FIG. 5. This increase in mechanical trail distance T results in increased stability, as described above. This increased mechanical trail distance T, and corresponding increase in stability, is the opposite result of what happens when telescopic fork suspension assemblies compress, which is a reduced mechanical trail distance and thus, a reduction in stability. Increasing mechanical trail distance as the suspension assembly compresses is a significant performance advantage over existing suspension assemblies.

As stated above, the increase in mechanical trail distance T as the front wheel suspension assembly 12 compresses advantageously increases wheel stability due to the increased caster effect. Compression is usually experienced during challenging riding conditions, such as braking, cornering, and shock absorbing, all of which benefit from the advantageously increased stability that results from the mechanical trail distance increase observed in the disclosed front wheel suspension assemblies.

As the front wheel suspension assembly 12 moves towards the further compressed state, for example as illustrated in FIG. 7, the steering axis S projects even farther ahead of the contact point 82, which results in a further decrease of a wheel carrier displacement distance 515 and a corresponding further increase in the mechanical trail distance T. The mechanical trail distance T is larger in the further compressed state of FIG. 7 than in the fully extended state of FIG. 5 or than in the partially compressed intermediate state of FIG. 6. This increase in mechanical trail distance T results in further increased stability. In the embodiment of FIGS. 5-7, increased mechanical trail distance T, and thus increased stability, occur when the suspension assembly is in the further compressed state (FIG. 7). In some embodiments, the mechanical trail distance T may decrease between the further compressed state (FIG. 7) and a fully compressed state (not shown). In yet other embodiments, the mechanical trail distance T may continue to increase from the further compressed state (FIG. 7) to the fully compressed state (not shown).

As a function of suspension compression and link movement, the mechanical trail distance T, and the offset distance 515, vary as the suspension assembly compresses and extends. In some embodiments, the mechanical trail distance T may increase, for example continuously increase, from full extension to full compression. In some embodiments, the increase in mechanical trail distance T may occur at a non constant (e.g., increasing or decreasing) rate.

Figure 8:
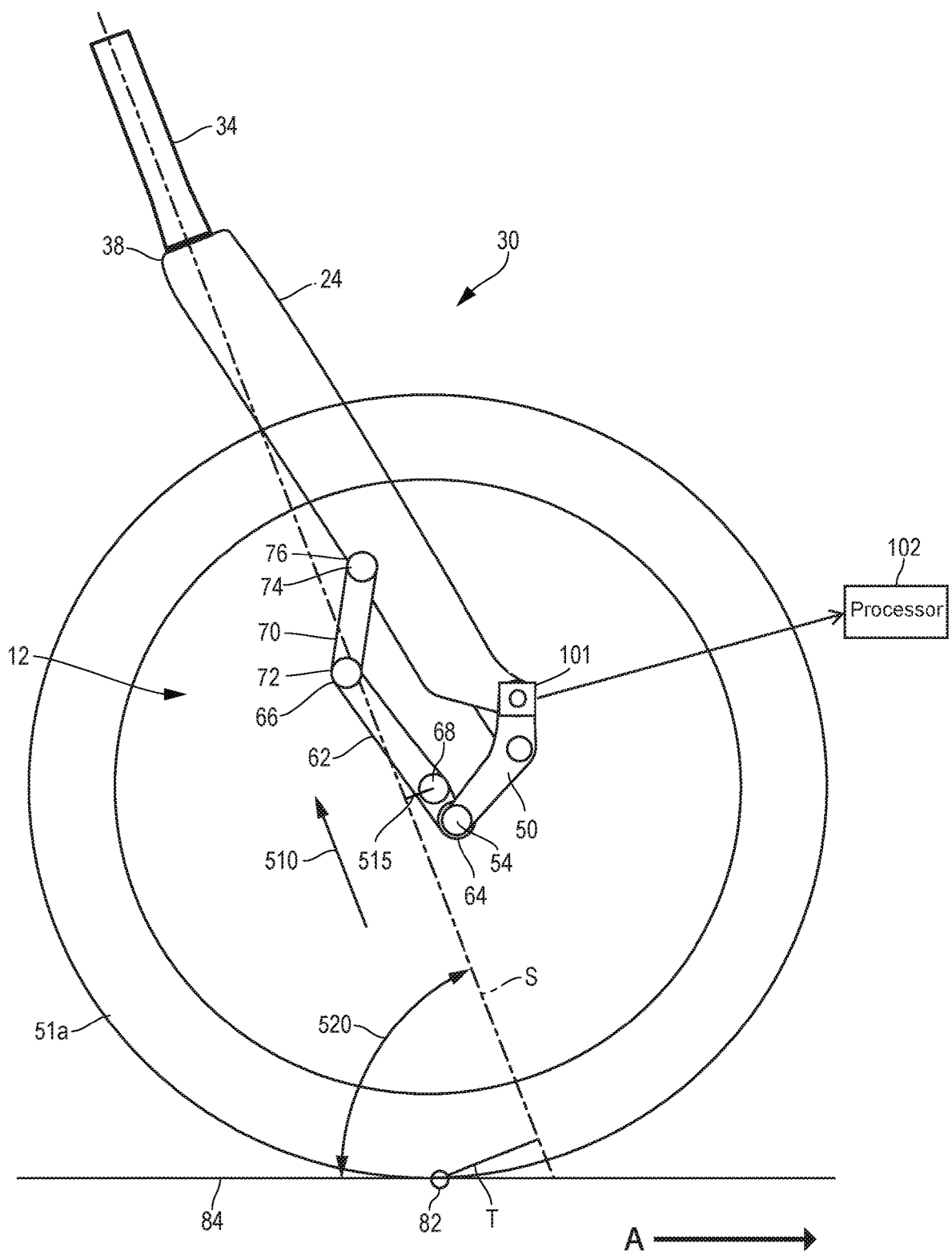
FIG. 8 is a side view of the front wheel assembly of FIG. 2 including a rotation sensor.

Turning now to FIG. 8, in some embodiments, a rotation sensor 101 may be located at any of the pivots, for example, at the shock link fixed pivot 52 in the embodiment of FIG. 8. The rotation sensor 101 measures angular displacement between the shock link 50 and the fork arm 24. In other embodiments, the rotation sensor 101 may measure angular displacement between any of the other links and may be located at any of the other pivots. The rotation sensor 101 may transmit the sensed data to a processor 102. In some embodiments, the processor 102 may be directly communicatively linked with the rotation sensor 101, where data is displayed on a monitor or display unit (not shown). In other embodiments, the processor 102 may be located remote from the rotation sensor 101 and data may be transmitted wirelessly. The processor 102 may process data from the rotation sensor 101 for display on a display unit, and/or save historical sensor data for later use. The data from the rotation sensor 101 may be used to modify the setup (e.g., change the ride characteristics) of the front wheel suspension assembly 12, which will be further described below with reference to FIGS. 13-15.

Advantageously, the rotation sensor 101 measures instantaneous rotation data that may be electronically output to a processor and/or a display for real-time use. The rotation sensor 101 also advantageously measures rotation data from a starting point without the need to be reset before every measurement. As a result, the rotation sensor 101 is capable of measuring a lesser rotation immediately after a greater rotation, without the need to reset the sensor. Additionally, the rotation sensor 101 can average measurements, or output other statistical data from as set of rotational measurement readings.

Turning now to FIGS. 9-12, in some embodiments, a pivot assembly 20 may also include an indicator 16 and a scale 18 in addition to a bolt 2 and a pivot body 4. The indicator 16 and scale 18 measure maximum deflection of the pivot assembly 20 during compression of the suspension assembly 12.

The pivot assembly 20 is seated in a central aperture 133 of a housing, such as a body of a link 114. The link 114 may be any of the links illustrated above. For example, the link 114 may be the shock link 50, the wheel carrier 60, or the control link 70. The indicator 16 is located about a circumference of the bolt 2, and the indicator 16 includes a first retention feature or protrusion 134, and a pointer 130. The bolt 2 includes a second retention feature or channel 140. In other embodiments, the second retention feature may be located about a circumference of the pivot body 4. While the first retention feature is illustrated as a protrusion 134 and the second retention feature is illustrated as a channel 140, in other embodiments, the protrusion 134 and the channel 140 may be reversed, or other retention features may be used that axially locate the indicator 16 relative to the pivot assembly 20 while allowing rotational movement between the indicator 16 and the pivot assembly 20 when a threshold force is exceeded.

The scale 18 is located on an external component, such as on the housing 114. The housing 114 may be part of a link 122, or in other embodiments, the housing may be part of a frame member, such as the fork arm 124. A bearing 110 is installed in the central aperture 133. The bearing 110 facilitates rotational movement between the pivot assembly 20 and the housing 114. The pivot assembly 20 positions the bearing 110 in radial and axial directions relative to the housing 114 such that any combination of links 122 or frame members 24 can articulate in a pivotable or rotatable manner. The first interference member 134 on the indicator 16 interfaces with, or is partially seated within, the second interference member 140 on the bolt 2, such that the first interference member 134 and second interference member 140 allow rotation of the indicator 16 when enough force is applied to overcome rotational friction and, at the same time, produce enough rotational friction to prevent rotation of the indicator 16 relative to the bolt 2 when sufficient force is not present, thereby maintaining relative positioning between the indicator 16 and the bolt 2 unless sufficient force is applied.

For example, the rotational friction between the first interference member 134 and the second interference member 140 may be overcome to cause the indicator 16 to rotate relative to the bolt 2 when force is applied to the indicator 16 by, for example, an actuator 126 during suspension assembly compression, or to return the indicator 16 to a starting position by force applied by a tool or a finger after suspension assembly is complete. By allowing the indicator 16 to rotate relative to the bolt 2 during suspension assembly compression, and by maintaining the indicator 16 rotational position relative to the bolt 2 when suspension assembly compression is complete, the indicator 16 provides a measurement of maximum suspension assembly compression for a compression event. The measurement may then be used by the rider to adjust suspension assembly characteristics to improve suspension assembly performance. While the first interference member 134 is illustrated as one or more protrusions and the second interface member 140 is illustrated as an annular channel, in other embodiments, the protrusions and the annular channel may be reversed, or other connection structures that produce rotational friction may be used. In some preferred embodiments, the indicator 16 comprises one or more of metal, plastic, composites, and compliant materials, such as natural or synthetic rubbers and urethanes. In other embodiments, the indicator comprises one or more of rubber, aluminum, steel, copper, other metals, fiberglass, carbon fiber, fiber reinforced thermoplastics, urethanes, foam, wood, and bamboo.

Figure 11A:
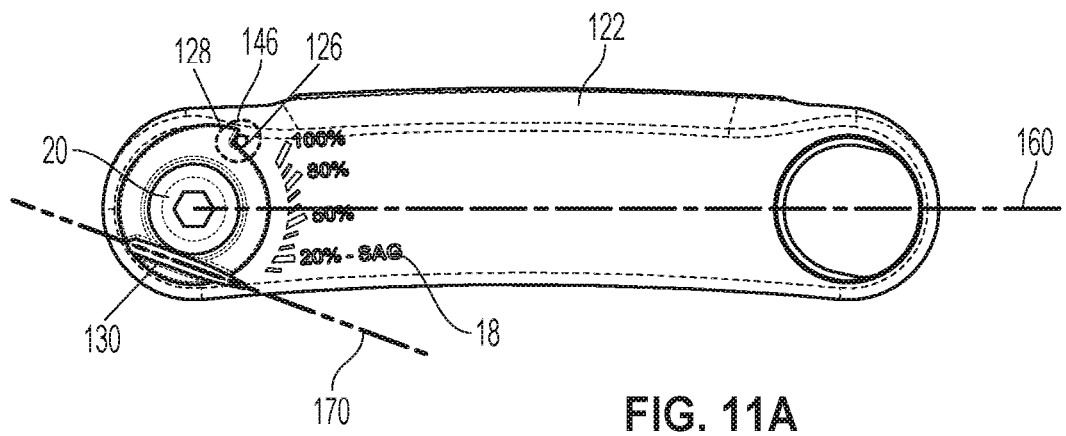
FIG. 11A is a side view of the link of FIG. 9 in a resting or unactuated first state.
Figure 11B:
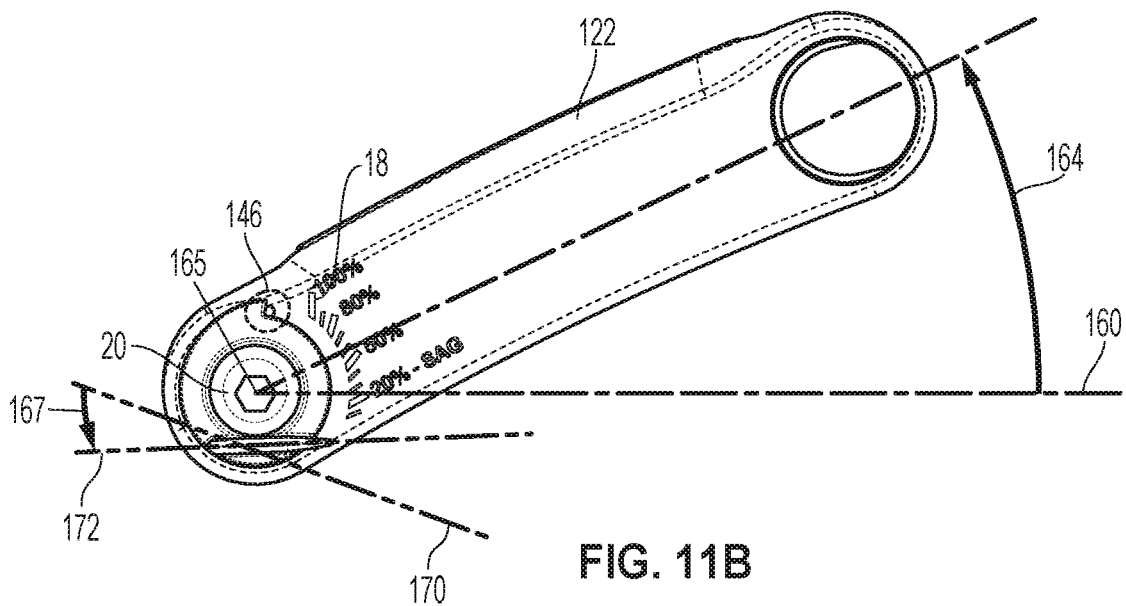
FIG. 11B is a side view of the link of FIG. 9 in an actuated or partially rotated state.
Figure 11C:
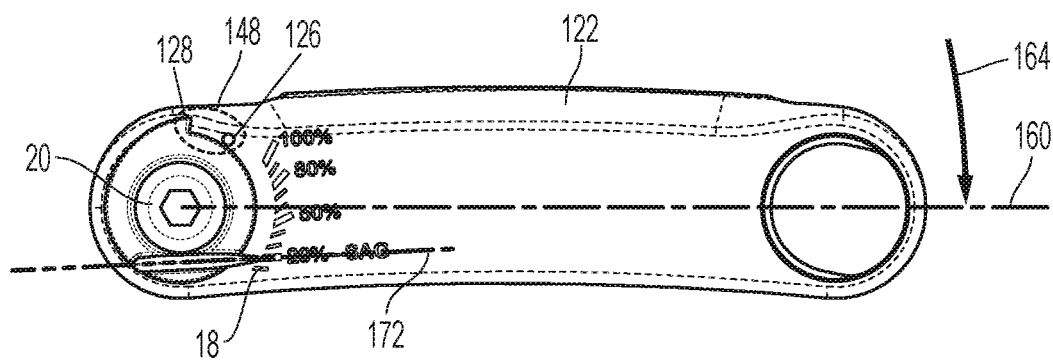
FIG. 11C is a side plan view of the link of FIG. 9, returned to the resting or unactuated first state, with an indicator pointer of the travel indicator indicating a maximum percentage of travel reached.

Turning now to FIGS. 11A-11C, the link 122 is illustrated in several views. Although referenced and illustrated in other figures, the bearing 110 and the pivot assembly 20 are not illustrated in FIGS. 11A-11C. As discussed above, the housing 114 may be part of the link 122. The actuator 126, which in the illustrated embodiment as a peg extending outward from the housing 114, and the scale 18 are also located on the housing 114. The housing 114 interfaces with or receives the bearing 110 and/or the pivot assembly 20. The bearing 110 may be press fit or slid into the central aperture 133 in the housing 114, and the pivot assembly 20 may then be press fit or slid into the central aperture 133 in the housing 114 as well. The scale 18 is attached to, or formed on an outer surface of the housing 114 proximate the central aperture 133. The scale 18 includes graduations or indications that line up with the pointer 130 of the indicator 16 subsequent to compression of the front wheel suspension assembly 12, thereby allowing the registering and measuring of a travel reading (e.g., suspension assembly compression) for a user after the front wheel suspension assembly 12 is compressed.

The indicator 16 comprises the first retention feature 134, which in the illustrated embodiment is a plurality of protrusions projecting inward into a center opening of the indicator, the pointer 130, which in the illustrated embodiment is a ledge that projects outward from a face of the indicator 16, and a stop member 128, which in the illustrated embodiment is a shoulder that is formed along an outer edge of the indicator 16. The stop member 28 forms a stop or buttress that cooperates with the actuator 126 during suspension assembly compression. The first interference member 134 is sized and shaped to cooperate with the second interference member 140, the protrusions seating within the channel of the second interference member 140. The seating of the first interference member 134 in the second interference member 140 allows rotation of the first interference member 134 relative to the second interference member 140 when sufficient force is applied to overcome the rotational friction between the first interference member 134 and the second interference member 140, which allows rotation of the indicator 16 relative to the bolt 2 (and thus relative to the scale 18) when force is applied to the indicator 16. The frictional interaction between the first interference member 134 and the second interference member 140 also provides enough resistance to hold the indicator 16 in place relative to the bolt 2 (and thus relative to the scale 18) when not being acted upon by outside forces.

The central aperture 165 of the indicator 16 has a center point that is coincident with a central axis of the pivot assembly 20. The pointer 130 is generally linear in shape and when viewed on the face of the indicator 16 forms a chord, intersecting the outer circumference of the indicator at two locations without passing through the center. In other embodiments, the indicator may or may not intersect the outer circumference of the indicator 16. The pointer 130 is offset a distance from the center point of the indicator 16, when viewed face-on. This offset distance 44 allows the user to easily and accurately read the suspension travel.

The link 122 rotates in an arc 164 about the central axis of the pivot assembly 20 during suspension travel (e.g., compression). As illustrated in FIG. 11A, the indicator 16 is in a resting position where the actuator 126 and stop member 128 are in contact at 146. The contact at 146 between the actuator 126 and stop member 128 is illustrated with a dashed circle in FIG. 11A. The link 122 has a first link axis 160 that is defined by a line that passes through the rotational axes of the pivot assemblies 20 in the link 122. The pointer 130 has a first indicator direction 170 that is defined by a line that passes through the center of the pointer 30 when being viewed in a direction axial to the central axis of the pivot assembly 20 (e.g., face-on to the indicator 16).

As illustrated in FIG. 11B, as the front wheel suspension assembly 12 compresses, the link 122 rotates in the arc 164. As the link 122 rotates, the actuator 126 remains engaged with the stop member 128 and the actuator 126 pushes the stop member 128 in the direction of rotation (counterclockwise in FIGS. 11A-11C) because the actuator 126 is rotating with the link 122. The pointer 130 rotates as the link 122 rotates due to the interaction between the actuator 126 and the stop member 128 described above. The maximum angular displacement 167 of the pointer 130 is equal to the maximum angular displacement 164 of the link 122. Thus, as the link 122 rotates, the contact at 146 between the actuator 126 and the stop member 128 causes the indicator 16 and thus the pointer 30 to rotate in relation to the pivot assembly 20, more specifically relative to the bolt 2.

As illustrated in FIG. 11C after the front wheel suspension 12 is compressed, it returns to an uncompressed state where the link 122 rotates back to its original position when the cycle suspension is at full extension. Because the actuator 126 moves in a direction away from the stop member 128 (e.g., in the clockwise direction in FIGS. 11A-11C) during extension of the front wheel suspension assembly 12, the actuator 126 separates from the stop member 128 and there is no longer a force significant enough to produce relative movement between the indicator 16 and the bolt 2. More specifically, the friction produced by the protrusion 134 on the indicator and the channel 140 on the bolt 2 is sufficient to prevent any further relative movement between the indicator 16 and the bolt 2. The separation 148 between the actuator 126 and stop member 128 is illustrated with a dashed oval in FIG. 11C. When the link 122 returns to its original (uncompressed) position, the angular relationship between the first link axis 160 and indicator alignment 172 is different than the angular relationship between the first link axis 160 and indicator direction 170 prior to suspension displacement (FIG. 11A) and as explained in further detail herein is reflective of the travel distance measurement that occurred during displacement. As the link 122 returns to its uncompressed original position, the scale 18 rotates (clockwise in FIGS. 11A-11C) with the link 122, thus changing a relative position between the scale 18 and the pointer 130. With the suspension fully extended, the user can view the pointer 130 and the scale 18, which indicates the amount of suspension travel that occurred during the compression event of the suspension assembly. For example, in the embodiment illustrated in FIGS. 11A-11C, the pointer indicates that 20% of suspension travel has been used during prior suspension displacements, as indicated by the pointer 130 being aligned with the 20% mark on the scale 18.

Figure 12:
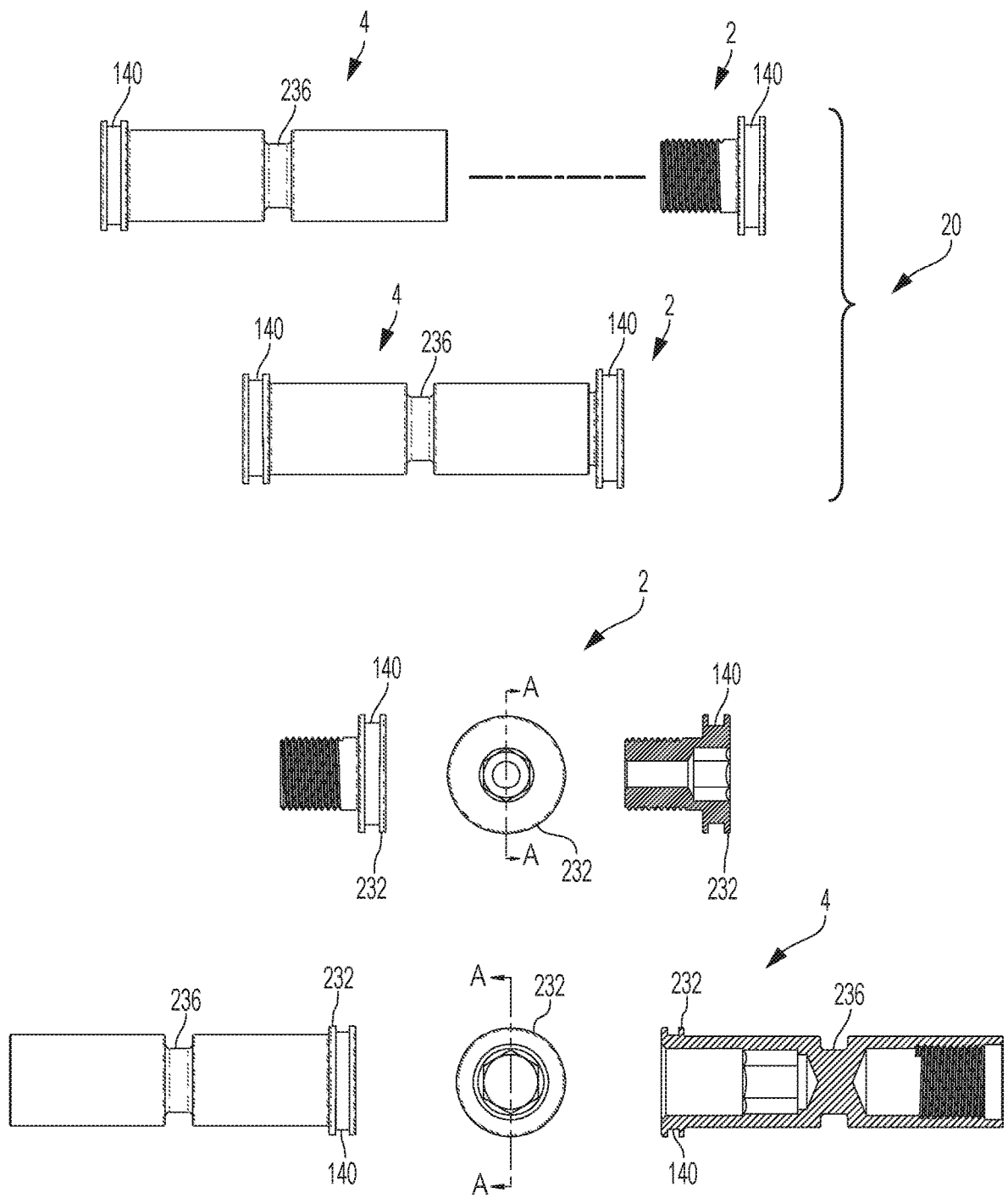
FIG. 12 illustrates various views of a pivot assembly.

Turning now to FIG. 12, in one embodiment, the pivot assembly 20 includes various subcomponents that are arranged to connect links 122 to each other or to connect a link to a frame member, such as the fork arm 24. The pivot assembly 20 includes a pivot body 4 and a bolt 2. The bolt 2 can form a cap 232 of the pivot assembly 20. The second retention feature 140 may be formed on one or both of the pivot body 4 and the bolt 2. In certain embodiments the pivot body 4 may include a slot 236 that can be used for purposes other than interfacing with an indicator. The cap 232 may be removably joined to the pivot body 4 by a threaded connection located at an end of the pivot body 4. The bolt 2 can likewise include a threaded connection such that when connected to the pivot body 4 by the threaded connection, an axial clamping force is produced. In other embodiments the pivot body 4 may include threads at both ends which can connect to bolts 2 at each end, such that when assembled to a pivot body 4 by threading, the cap 232 of the first bolt 2, and the cap 232 of the second bolt 2 produce an axial clamping force. The pivot body 4 and the bolt 2 can include one or more tool interfaces that can be used to connect with a tool to provide a means of rotating the pivot body 4 and/or the bolt 2 during assembly.

In alternate embodiments, threads can be either internal or external on the pivot body 4 or on the bolt 2. In other embodiments, the slot 236 can be fully formed about the diameter of the pivot body 4, or formed as a partial slot 236. In yet other embodiments, the slot 236 may be formed in the bolt 2.

As illustrated in the figures, the first and second retention features 134, 140 provide a captured mounting mechanism for the indicator 16, which locates the indicator 16 axially on the bolt 2 while allowing rotational movement between the indicator 16 and the bolt 2 when sufficient force is applied to overcome rotational friction. In certain embodiments, the first retention feature 134 may be any one or more of a tab, a slot, a bump, a hole, a protrusion, a depression, a boss, a flap, or any other type of feature that can mate or interface with a corresponding second retention feature 140. In certain embodiments, the second retention feature 140 may be any one or more of a tab, a slot, a bump, a hole, a protrusion, a depression, a boss, a flap, or any other type of feature that can mate or interface with a corresponding first retention feature 34. Interference features 134, 140 may cooperate with other surfaces or other parts such as the pivot bodies 4, the bolts 2, the links 122, or/and or the frame members to allow rotation of the indicator 16 and at the same time allow for enough rotational interference friction that the indicator 16 can be rotated back to an original position by the actuator 126 or by a human finger if registration of a new travel displacement measurement is desired, and also allow for enough rotational interference friction to hold the indicator 16 in place when not being acted upon outside forces, such as the actuator 126 or the human finger, such that a prior travel displacement measurement can be observed and registered.

In certain embodiments, the actuator 126 may be any one or more of a tab, a slot, a bump, a hole, a protrusion, a depression, a boss, a flap, or any other type of feature that can mate or interface with the stop member 128. In certain embodiments, the stop member 128 may be any one or more of a tab, a slot, a bump, a hole, a protrusion, a depression, a boss, a flap, or any other type of feature that can mate or interface with the actuator 126. The actuator 126 and the stop member 128 may cooperate with other surfaces or other parts such as the pivots bodies 4, the bolts 2, the links 122, and or the frame members to cause rotation of the indicator 16 when there is contact 146 between the actuator 126 and stop member 128.

Figure 13:
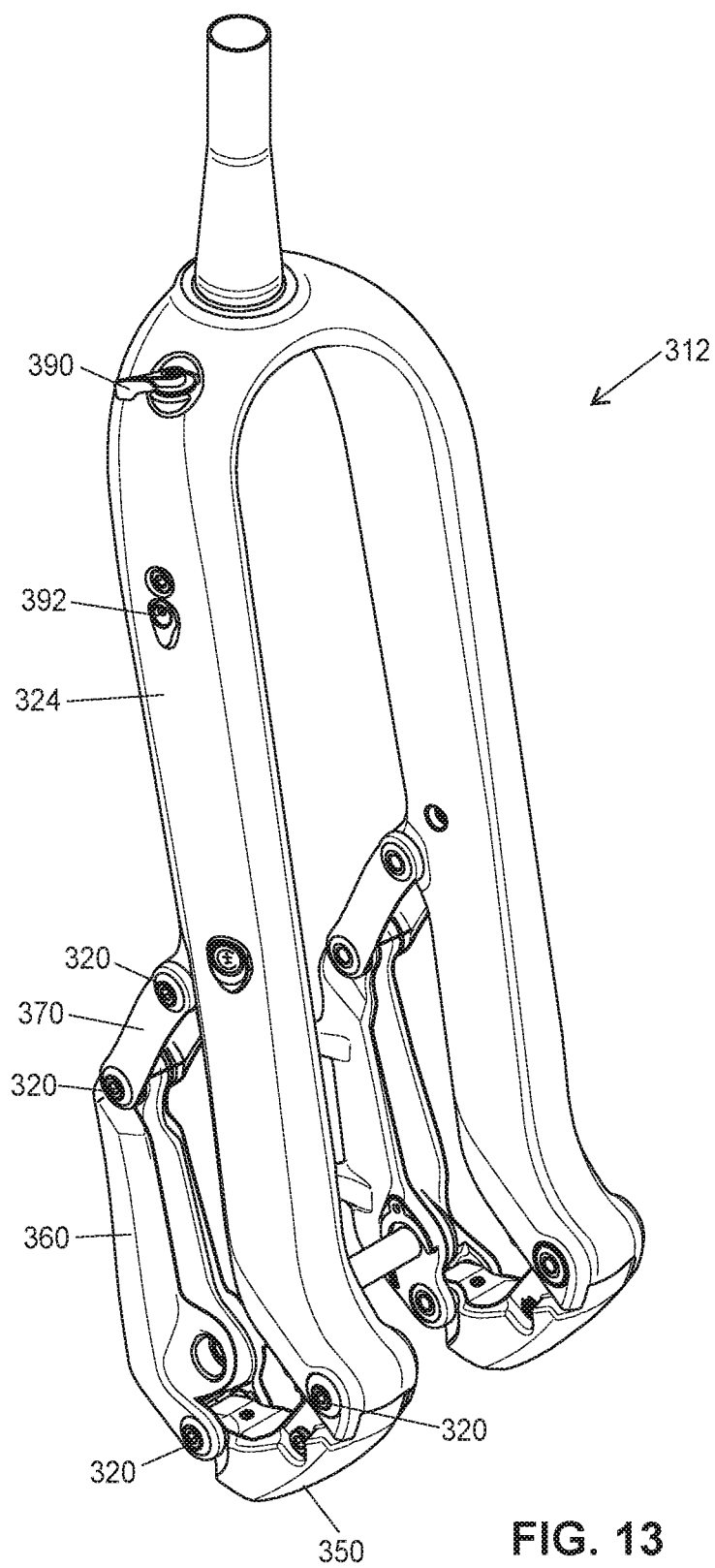
FIG. 13 is a perspective view of another embodiment of a front wheel suspension assembly including various adjustment ports for the shock absorber.
Figure 14:
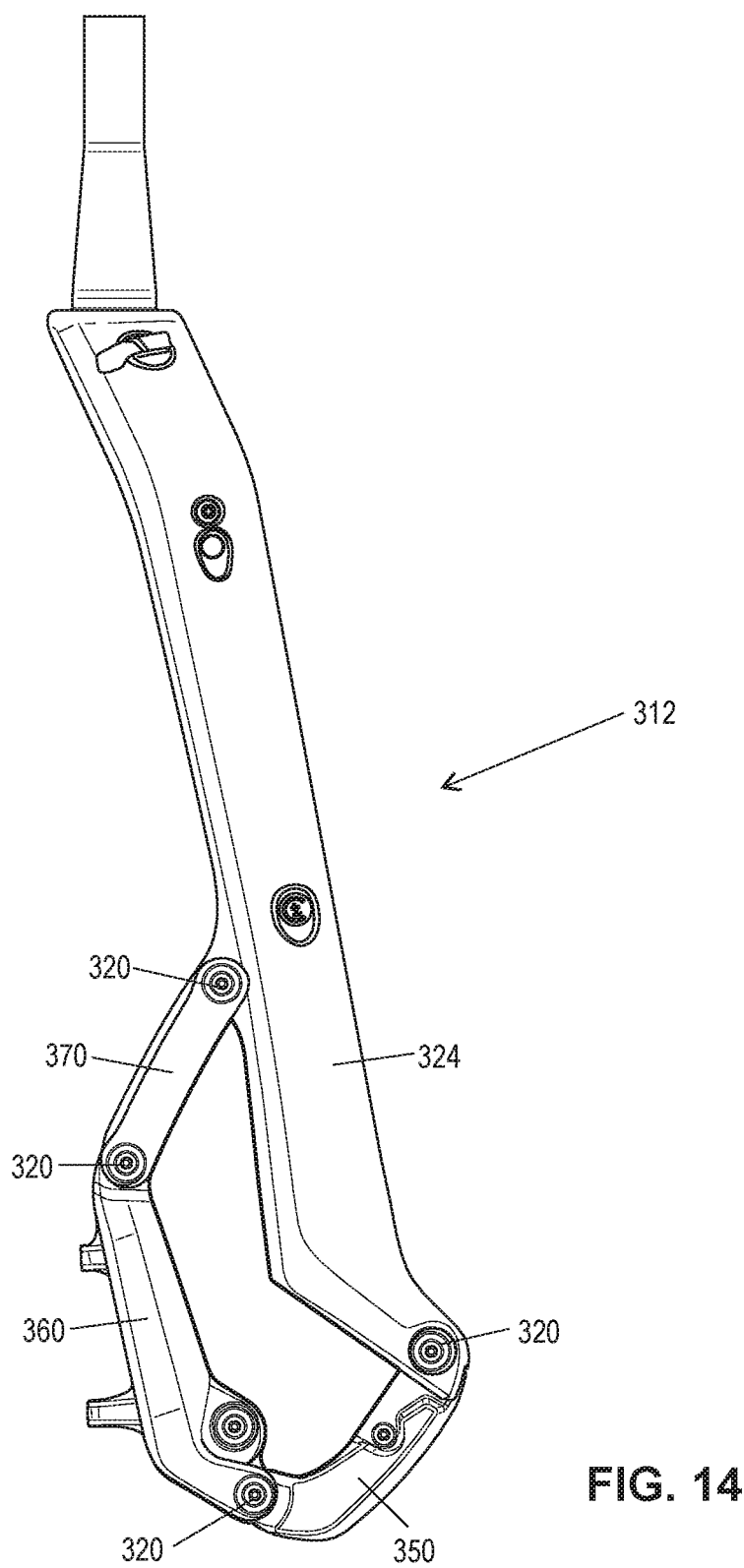
FIG. 14 is a side view of the front wheel suspension assembly of FIG. 13.

Turning now to FIGS. 13 and 14, another embodiment of a front wheel suspension assembly 312 is illustrated. Any feature discussed above with respect to FIGS. 1-12 may be included in the embodiment of FIGS. 13 and 14, even if not illustrated. Likewise, any feature of the embodiment of FIGS. 13 and 14 may be included in the embodiment of FIGS. 1-12, even if not illustrated.

Similar to the embodiment of FIG. 2, the front wheel suspension assembly 312 includes a fork arm 324, a shock link 350, a wheel carrier 360, and a control link 370. The links are pivotably connected by pivots 320, as discussed above. The rotation sensor (not illustrated in FIGS. 13 and 14) may be connected to the front wheel suspension assembly 312, for example, at one of the pivots 320. The fork arm 324 may include one or more adjustment levers or ports for adjusting the setup (or ride characteristics) of the front wheel suspension assembly 312. For example, an adjustment lever 390 may be used to change the volume of the gas spring (for example by moving a piston within the gas chamber), which changes the gas volume or gas pressure within the gas chamber. A gas port 392 may be located on the fork arm 324, and allows access to a valve that is fluidly connected with the gas chamber, to allow addition or subtraction of gas molecules from the gas chamber, which thereby changes the gas pressure within the gas chamber.

Figure 15:
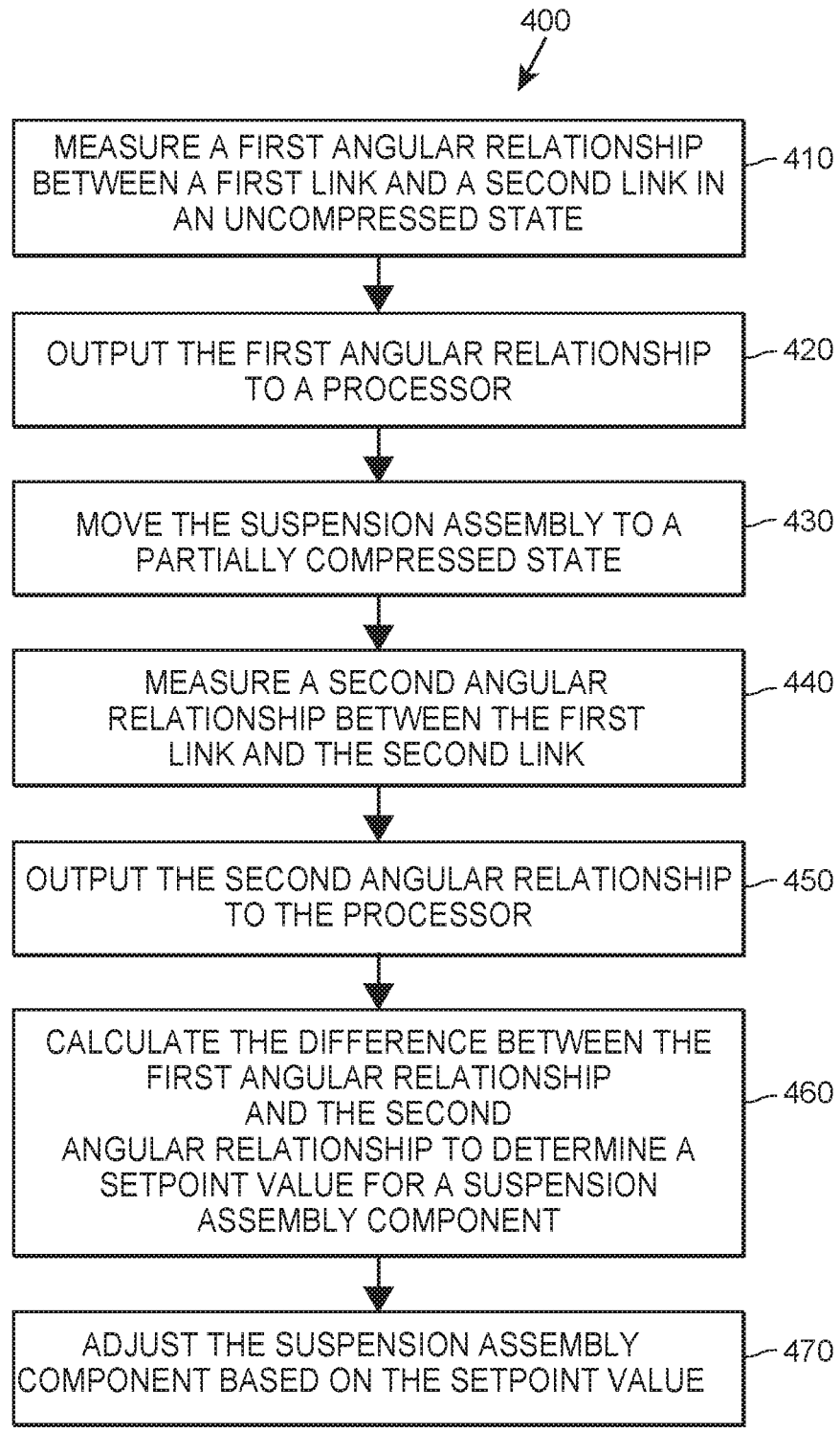
FIG. 15 is a logic diagram illustrating a method of adjusting a setpoint to customize ride characteristics for a rider.

Turning now to FIG. 15, a logic diagram 400 is illustrated for a method of using rotational data from the rotation sensor to adjust a setup of a front wheel suspension assembly. Sensed measurements from the rotation sensor may be used to adjust and/or modify riding characteristics of the front wheel suspension assembly. A first angular relationship between a first link and a second link may be measured by the rotation sensor 101 when the front wheel suspension assembly is in an uncompressed state at 410. The first angular relationship is output to the processor 102 at 420. The front wheel suspension assembly 312 is moved into a partially compressed state at 430. Partially compressed state, as used herein, means any state of compression other than completely uncompressed. A partially compressed state includes full compression. A second angular relationship between the first link and the second link is measured by the rotation sensor 101 in the partially compressed state at 440. The second angular relationship is output to the processor 102 at 450. The processor calculates a difference between the first angular relationship and the second angular relationship at 460 to determine a setpoint value for a component of the front wheel suspension assembly 312. In one embodiment, the component is the gas spring of the shock absorber and the setpoint value is a gas pressure in the gas chamber. In another embodiment, the component is the damper in the shock absorber and the setpoint value is a size of the opening in the damper piston. Optionally, the setpoint value from the processor may be output to a display. Finally, the component is adjusted based on the setpoint value at 470.

The step 470 of adjusting the component may include changing a characteristic of a shock absorber, a damper, or a combination of a shock absorber and a damper, based on the setpoint value. The characteristic may be a fluid flow rate through the opening in the damper piston, which requires changing a size of the opening based on the setpoint value. In other embodiments, the step of adjusting the component may include changing a characteristic of one of a gas spring or a coil spring. More specifically, the spring constant of the gas or coil spring may be changed by changing the gas pressure in the gas spring, or by changing a spring force produced by a coil spring. The spring force may be changed by changing a spring constant. In the gas spring, the spring constant may be changed by varying gas pressure in the gas spring and/or by changing a gas volume of the gas spring.

By changing a component characteristic of the front wheel suspension assembly based on angular measurements taken by a rotation sensor, a user can quickly and accurately change the setup of the front wheel suspension assembly to suit his or her needs.

The rotation sensor may be connected to any pivot, fixed or floating, or any link in the suspension assembly. Additionally, in other embodiments, the rotation sensor may be one of a magnetic sensor, an optical sensor, an electrical sensor, an accelerometer, a potentiometer, or a resistive sensor. In other embodiments, the rotation sensor may be one of an optical reflective sensor or an optical interrupter sensor. In yet other embodiments, the rotation sensor may be one of a variable reluctance sensor, an eddy current killed oscillator sensor, a Wiegand sensor, or a Hall effect sensor.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

A variety of modifications, alterations, and combinations can be made with respect to the above described embodiments without departing from the scope of the invention, and that such modifications, alterations, and combinations are to be viewed as being within the scope of the inventive concept.

What is claimed:

1. A suspension assembly for a cycle, the suspension assembly comprising:
   a first link having a first pivot;
   a second link movably connected to the first link by the first pivot; and
   a rotation sensor operably connected to the first pivot,
   wherein the rotation sensor measures angular displacement between the first link and the second link, and
   wherein the rotation sensor is one of an optical reflective sensor, an optical interrupter sensor, a variable reluctance sensor, an eddy current killed oscillator sensor, a Wiegand sensor, or a Hall effect sensor.

2. The suspension assembly of claim 1, further comprising a shock absorber operably connected to one of the first link or the second link.

3. The suspension assembly of claim 1, wherein the first pivot is a fixed pivot.

4. The suspension assembly of claim 1, wherein the first pivot is a floating pivot.

5. The suspension assembly of claim 1, wherein the first link is a fork arm.

6. The suspension assembly of claim 1, wherein the first link is one link in a front wheel cycle suspension assembly.

7. A front wheel suspension assembly for a cycle, the suspension assembly comprising:
   a first front suspension link having a first pivot;
   a second front suspension link movably connected to the first suspension link by the first pivot;
   a wheel operably connected to one of the first front suspension link or the second front suspension link; and
   a rotation sensor operably connected to the first pivot,
   wherein the rotation sensor measures angular displacement between the first front suspension link and the second front suspension link.

8. The front suspension assembly of claim 7, wherein the rotation sensor comprises one of a magnetic sensor, an optical sensor, an electrical sensor, an accelerometer, a potentiometer, or a resistive sensor.

9. The front suspension assembly of claim 8, wherein the rotation sensor is one of a variable reluctance sensor, an eddy current killed oscillator sensor, a Wiegand sensor, or a Hall effect sensor.

10. The front suspension assembly of claim 8, wherein the rotation sensor is one of an optical reflective sensor or an optical interrupter sensor.

11. The front suspension assembly of claim 7, further comprising a shock absorber operably connected to one of the first front suspension link or the second front suspension link.

12. The front suspension assembly of claim 7, wherein the first pivot is a fixed pivot.

13. The front suspension assembly of claim 7, wherein the first pivot is a floating pivot.

14. The front suspension assembly of claim 7, wherein the first front suspension link is a fork arm.

15. A method of adjusting a suspension assembly for a cycle, the method comprising:
   providing a suspension assembly including a first link having a first pivot, a second link movably connected to the first link by the first pivot, and a rotation sensor operably connected to the first pivot;
   measuring, with the rotation sensor, a first angular relationship between the first link and the second link when the suspension assembly is in an uncompressed state;
   outputting the first angular relationship to a processor;
   moving the suspension assembly into a compressed state;
   measuring, with the rotation sensor, a second angular relationship between the first link and the second link in the compressed state;
   outputting the second angular relationship to the processor;
   calculating a difference between the first angular relationship and the second angular relationship, in the processor, to determine a setpoint value for a component of the suspension assembly;
   outputting the setpoint value from the processor to a display; and
   adjusting a component of the suspension assembly based on the setpoint value.

16. The method of claim 15, wherein the step of adjusting the component includes changing a characteristic of a shock absorber, a damper, or a combination of a shock absorber and a damper, based on the setpoint value.

17. The method of claim 16, wherein the characteristic is a fluid flow rate through an orifice.

18. The method of claim 17, further comprising changing a size of the orifice based on the setpoint value.

19. The method of claim 15, wherein the step of adjusting the component includes changing a characteristic of one of a gas spring or a coil spring.

20. The method of claim 19, wherein the characteristic is a spring constant.

21. The method of claim 20, wherein the spring constant is changed by varying gas pressure in the gas spring.

22. The method of claim 21, wherein the gas pressure is varied by changing an internal volume of the gas spring.

* * * * *

UNITED STATES PATENT AND TRADEMARK OFFICE
CERTIFICATE OF CORRECTION

PATENT NO. : 11,524,744 B2
APPLICATION NO. : 16/379386
DATED : December 13, 2022
INVENTOR(S) : David Weagle It is certified that error appears in the above-identified patent and that said Letters Patent is hereby corrected as shown below:

In the Specification

In Column 7, Line 59, delete "www kaztechnolgies.com;" and insert --www.kaztechnologies.com;--.

In Column 11, Line 64, delete "and or" and insert --and/or--.

In Column 11, Line 65, delete "and or" and insert --and/or--.

In Column 11, Line 67, delete "and or" and insert --and/or--.

In Column 19, Line 32, delete "or/and or" and insert --and/or--.

In Column 19, Line 53, delete "and or" and insert --and/or--.

In the Claims

In Column 22, Claim 8, Line 1, delete "front suspension" and insert --front wheel suspension--.

In Column 22, Claim 9, Line 5, delete "front suspension" and insert --front wheel suspension--.

In Column 22, Claim 10, Line 9 (Approx.), delete "front suspension" and insert --front wheel suspension--.

In Column 22, Claim 11, Line 12 (Approx.), delete "front suspension" and insert --front wheel suspension--.

In Column 22, Claim 12, Line 16 (Approx.), delete "front suspension" and insert --front wheel suspension--.

Signed and Sealed this
Twenty-second Day of August, 2023

Katherine Kelly Vidal
*Director of the United States Patent and Trademark Office*

In Column 22, Claim 13, Line 18 (Approx.), delete "front suspension" and insert --front wheel suspension--.

In Column 22, Claim 14, Line 20 (Approx.), delete "front suspension" and insert --front wheel suspension--.